US007885820B1

(12) United States Patent
Mancisidor et al.

(10) Patent No.: US 7,885,820 B1
(45) Date of Patent: Feb. 8, 2011

(54) EXPERT SYSTEM SUPPORTED INTERACTIVE PRODUCT SELECTION AND RECOMMENDATION

(75) Inventors: Rod Mancisidor, Round Rock, TX (US); Charles R. Erickson, Cedar Park, TX (US); Ahmed Gheith, Round Rock, TX (US); William W. Chan, Austin, TX (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 1984 days.

(21) Appl. No.: 09/909,250

(22) Filed: Jul. 19, 2001

Related U.S. Application Data

(60) Provisional application No. 60/219,783, filed on Jul. 19, 2000.

(51) Int. Cl.
*G06Q 90/00* (2006.01)
(52) U.S. Cl. .................................................. 705/1.1
(58) Field of Classification Search ................. None
See application file for complete search history.

(56) References Cited

U.S. PATENT DOCUMENTS

| | | | |
|---|---|---|---|
| 4,949,278 A * | 8/1990 | Davies et al. ............... 706/10 |
| 4,992,940 A | 2/1991 | Dworkin |
| 4,999,833 A | 3/1991 | Lee |
| 5,175,800 A * | 12/1992 | Galis et al. .................. 706/45 |
| 5,309,355 A | 5/1994 | Lockwood |
| 5,434,994 A | 7/1995 | Shaheen et al. |
| 5,493,490 A | 2/1996 | Johnson |
| 5,517,405 A * | 5/1996 | McAndrew et al. ........... 706/45 |
| 5,546,539 A | 8/1996 | Poling |
| 5,701,419 A | 12/1997 | McConnell |
| 5,758,257 A | 5/1998 | Herz et al. |
| 5,784,539 A * | 7/1998 | Lenz ............................ 706/45 |
| 5,809,282 A | 9/1998 | Cooper et al. ............... 395/500 |
| 5,822,743 A * | 10/1998 | Gupta et al. .................. 706/50 |
| 5,951,694 A | 9/1999 | Choquier et al. |
| 5,963,939 A * | 10/1999 | McCann et al. ................ 707/4 |
| 5,970,482 A | 10/1999 | Pham et al. |

(Continued)

OTHER PUBLICATIONS

Damiani et al., A Human Centered Agent-Based Architecture for Electronic Brokerage, Proceedings of the ACM Symposium on Applied Computing, 1999, pp. 243-249.

(Continued)

*Primary Examiner*—Dennis Ruhl
*Assistant Examiner*—Gerardo Araque, Jr.
(74) *Attorney, Agent, or Firm*—William S. Morriss; Frost Brown Todd LLC

(57) ABSTRACT

Expert system supported interactive product selection and recommendation. The invention assists an agent to interact with a customer and to provide selection and recommendation of available products and/or services that offer a workable solution for the customer. The invention allows for the use of agents of varying skill levels, including relatively low skill level, without suffering deleterious performance. From certain perspectives, an expert system employed using various aspects of the invention allows the agent to provide real time interaction with a customer and to provide a real time recommended solution to that customer. Many traditional approaches dealing in complex industries require that agent's have a high degree of skill and expertise. The invention allows even a novice agent to service a customer's needs without requiring a high skill level or up-front training that is often at the expense of the provider seeking to market its products and/or services.

32 Claims, 12 Drawing Sheets

U.S. PATENT DOCUMENTS

| | | | |
|---|---|---|---|
| 5,983,220 | A | 11/1999 | Schmitt |
| 5,987,376 | A | 11/1999 | Olson et al. |
| 6,012,051 | A | 1/2000 | Sammon, Jr. et al. |
| 6,018,722 | A * | 1/2000 | Ray et al. ................. 705/36 R |
| 6,032,129 | A | 2/2000 | Greef et al. |
| 6,035,283 | A | 3/2000 | Rofrano |
| 6,067,525 | A | 5/2000 | Johnson et al. |
| 6,070,149 | A * | 5/2000 | Tavor et al. .................... 705/26 |
| 6,088,722 | A | 7/2000 | Herz et al. |
| 6,105,003 | A | 8/2000 | Morohashi et al. |
| 6,112,186 | A | 8/2000 | Bergh et al. |
| 6,117,187 | A | 9/2000 | Staelin |
| 6,119,101 | A | 9/2000 | Peckover |
| 6,125,356 | A | 9/2000 | Brockman et al. |
| 6,138,105 | A | 10/2000 | Walker et al. |
| 6,145,002 | A * | 11/2000 | Srinivasan ................. 709/225 |
| 6,169,979 | B1 | 1/2001 | Johnson |
| 6,178,546 | B1 | 1/2001 | McIntyre |
| 6,219,654 | B1 | 4/2001 | Ruffin |
| 6,220,743 | B1 | 4/2001 | Campestre et al. |
| 6,233,609 | B1 | 5/2001 | Mittal |
| 6,236,978 | B1 | 5/2001 | Tuzhillin |
| 6,243,754 | B1 * | 6/2001 | Guerin et al. ............... 709/227 |
| 6,247,005 | B1 | 6/2001 | Edwards et al. |
| 6,266,649 | B1 | 7/2001 | Linden et al. |
| 6,285,986 | B1 | 9/2001 | Andrews |
| 6,292,830 | B1 * | 9/2001 | Taylor et al. ................ 709/224 |
| 6,317,722 | B1 | 11/2001 | Jacobi et al. |
| 6,332,129 | B1 | 12/2001 | Walker et al. |
| 6,340,977 | B1 * | 1/2002 | Lui et al. .................... 715/709 |
| 6,341,276 | B1 | 1/2002 | Bender et al. |
| 6,356,884 | B1 | 3/2002 | Thaler |
| 6,397,193 | B1 | 5/2002 | Walker et al. |
| 6,442,493 | B1 | 8/2002 | Naillon |
| 6,473,791 | B1 | 10/2002 | Al-Ghosein et al. |
| 6,473,794 | B1 | 10/2002 | Guheen et al. |
| 6,477,520 | B1 | 11/2002 | Malaviya et al. |
| 6,519,571 | B1 | 2/2003 | Guheen et al. |
| 6,526,387 | B1 * | 2/2003 | Ruffin et al. .................... 705/7 |
| 6,529,954 | B1 | 3/2003 | Cookmeyer, II et al. |
| 6,553,346 | B1 | 4/2003 | Walker et al. |
| 6,578,054 | B1 | 6/2003 | Hopmann et al. |
| 6,600,749 | B1 | 7/2003 | Hayball et al. |
| 6,601,036 | B1 | 7/2003 | Walker et al. |
| 6,658,396 | B1 | 12/2003 | Tang et al. |
| 6,671,716 | B1 | 12/2003 | Diedrichsen et al. |
| 6,741,975 | B1 * | 5/2004 | Nakisa et al. ................. 706/47 |
| 6,745,172 | B1 | 6/2004 | Mancisidor et al. |
| 6,748,369 | B2 | 6/2004 | Khedkar et al. |
| 6,799,222 | B1 | 9/2004 | Endo |
| 6,826,549 | B1 | 11/2004 | Marks et al. |
| 2001/0014868 | A1 | 8/2001 | Herz et al. |
| 2001/0034727 | A1 | 10/2001 | Ciurcina |
| 2001/0044743 | A1 | 11/2001 | McKinley et al. |
| 2001/0044751 | A1 | 11/2001 | Pugliese, III et al. |
| 2001/0044759 | A1 | 11/2001 | Kutsumi et al. |
| 2001/0049632 | A1 * | 12/2001 | Rigole ......................... 705/26 |
| 2001/0051893 | A1 | 12/2001 | Hanai et al. |
| 2002/0002502 | A1 | 1/2002 | Maes et al. |
| 2002/0004764 | A1 | 1/2002 | Stolze et al. |
| 2002/0010645 | A1 | 1/2002 | Hagen et al. |
| 2002/0036658 | A1 * | 3/2002 | Carolan et al. .............. 345/764 |
| 2002/0052767 | A1 | 5/2002 | Yano |
| 2002/0055890 | A1 | 5/2002 | Foley |
| 2002/0055906 | A1 | 5/2002 | Katz et al. |
| 2002/0091990 | A1 | 7/2002 | Little et al. |
| 2002/0107824 | A1 * | 8/2002 | Ahmed ......................... 706/46 |
| 2003/0061202 | A1 | 3/2003 | Coleman |
| 2003/0167222 | A1 | 9/2003 | Mehrotra et al. |
| 2003/0191841 | A1 | 10/2003 | DeFerranti et al. |
| 2004/0024656 | A1 | 2/2004 | Coleman |

OTHER PUBLICATIONS

Vekiarides et al., NetCap: A Tool for the Capacity Planning of Ethernet LANs, IEEE International Workshop on Modeling, Analysis, and Simulation of Computer and Telecommunications Systems Proceedings, 1998, pp. 198-203.

Ahmad, Maqbol, Communication Network Planning Using Artificial Neural Networks, Singapore ICCS Conference Proceedings, 1994, pp. 810-813.

Yu, Che-Fen, Customer Service Provisioning In Intelligent Networks, IEEE Network Magazine, 1991, pp. 25-28, v. 4.

Bright et al., Service Creation in an Intelligent Network, IEEE Global Telecommunications Conference and Exhibition, 1989, pp. 137-140, v. 1.

Trimm DeWitt, Regina, Expert Systems for User Service, ACM SIGUCCS User Service Conference XVII, 1989, pp. 243-246.

Jungen et al., An Intelligent Interactive Project management Support System, European Journal of Operational Research, 1995, pp. 60-81, v. 84.

Amiri, Ali, The Design of Service Systems with Queueing Time Cost, Workload Capacities and Backup Service, European Journal of Operational Research, 1998, pp. 201-217, v. 104.

Tsuchida et al., Concept and Architecture of Intelligent Dynamic Service Provisioning (IDSP), NNT R&D, 1997, author abstract.

Office Action dated Dec. 10, 2003 for U.S. Appl. No. 09/909,241, filed Jul. 19, 2001.

Office Action dated Jun. 4, 2004 for U.S. Appl. No. 09/909,241, filed Jul. 19, 2001.

Carchiolo, et al. "An Agent Based Platform for a Service Provider", NEC Research Index Online, 1998, Retrieved from the Internet: http://citeseer.nj.nec.com/91085.html, pp. 1-6, 1998.

Caswell et al., "Using Service Models for Managemetn of Internet Services", IEEE Journal on Selected Areas in Communications, May 2000, vol. 18, Issue 5, pp. 686-701.

McNnight, et al. "Pricing Internet services: Proposed Improvements", Computer, Mar. 2000, vol. 33, pp. 108-109.

Gibbens et al., "Internet Services Classes Under Competition," IEEE Journal on Selected Areas in Communications, Dec. 2000, vol. 18, No. 12.

Semret et al., "Pricing, Provisioning and Peering: Dynamic Markets for Differentiated Internet Services and Implications for Network Interconnections," IEEE Journal on Selected Areas in Communications, Dec. 2000, vol. 18, No. 12, pp. 2499-2513.

Bakos, Y., "The Emerging Role of Electronic Marketplaces on the Internet", Communications of the ACM, Aug. 1998, vol. 41, No. 8, pp. 35-42.

Johnson et al., "Consulting Without Consultants: Expert Systems Applications in User Services", Proceedings of the 17th Annual ACM SIGUCCS Conference on User Services, 1989, pp. 335-342.

Weiss, "The Seamless, Web-based Library: A Meta Site for the 21st Century," Proceedings of the 62nd ASIS Annual Meeting, vol. 36, Washington, D.C., Oct. 31-Nov. 4, 1999.

Brune et al., "A Resource Description Environment for Distributed Computing Systems," High Performance Distributed Computing, 1999 Proceedings, 8th International Symposium on Redondo Beach, CA, Aug. 3-6, 1999, Los Alamitos, CA, pp. 276-286.

Ferguson et al., "A Knowledge-based Sales Assistant for Data Communications Networks," IEEE, Jun. 10, 1987, vol. 3, pp. 1634-1642.

Ishiwa et al., "An Expert System for Planning Private Networks," NEC Research and Development, Nippon Electric Ltd., Tokyo, Japan, Jul. 1, 1994, vol. 35, No. 3, pp. 306-314.

Somers et al., "Intelligent Resource Dimensioning in ATM Networks," Proceedings of the International SWIT, Apr. 23, 1995, vol. 2, SYMP. 15, pp. 62-66.

European Search Report dated Jun. 13, 2002.

European Search Report dated Jun. 7, 2002.

International Search Report Mailed Feb. 20, 2004.

Office Action dated Dec. 2, 2004 for U.S. Appl. No. 09/769,662 filed Jan. 18, 2001.

"*Avoiding Packaging Mismatch with Flexible Packaging*", Deline, Robert; IEEE Feb. 2001, pp. 124-143.

*Fuzzy Logic Techniques Applied to the Control of a Three-Phase Induction Motor*, Afonso, J.L.; Fonseca, J.; Martins, J.S.; Couto, C.A., Available at https://repositorium.sdum.uminho.pt/bitstream/1822/1685/1/Motor_97.pdf.

"*Fuzzy Queries Against a Crisp Database over the Internet: an Implementation*", Kaprzyk, J; Zadrozny, S., Knowledge-Based Intelligent Engineering Systems and Allied Technologies, vol. 2, Aug. 30-Sep. 1, 2000, pp. 704-707, vol. 2.

"*Fuzzy Semantic Measurement for Synonymy and its Application in an Automatic Question-Answering System*", Sun, J.; Shaban, K.; Podder, S.; Karry, F.; Basir, 0.; Kamel, M., Available at http://pami.uwaterloo.ca/pub/spodder/paper2.pdf.

"*Intelligent Tutoring System: An Expert-System Trainer for Herring Roe Grading*", Rahbari, R.; Meech, J.A.; de Silva, C.W., American Control Conference, 1997. Proceedings of the 1997 vol. 5, Jun. 4-6, 1997, pp. 3171-3175, vol. 5.

Non-Final Rejection dated Aug. 28, 2008 for U.S. Appl. No. 09/764,662.

Non Final Rejection dated Sep. 19, 2008 for U.S. Appl. No. 11/746,767.

Office Action dated Mar. 20, 2008 for U.S. Appl. No. 09/764,662.

Carchiolo, et al.; "An Agent BAed Platform for a Service Provider"; Catania (Italy); pp. 1-7.

Caswell, et al.; Using Service Models for Management of Internet Services: IEEE Journal on Selected Areas in Communications, vol. 18, No. 5 (May 2000); pp. 686-701.

McKnight, et al.; "Pricing Internet Services: Proposed Improvements"; pp. 108-109.

Gibbens, et al.; Internet Service Classes Under Competition:; IEEE Journal on Selected Areas in Communications, vol. 18, No. 12 (Dec. 2000); pp. 2490-2497.

Semret, et al; "Pricing, Provisioning and Peering; Dynamic Markets for Differentiated Internet Services and Implications for Network Interconnections" UEEE Journal on Selected Areas in Communications, vol. 18, No. 12 (Dec. 2000); pp. 2499-2513.

Bakos, Yannis; The Emerging Role of Electronic Marketplkaces on the Internet:; Communications of the ACM vol. 41, No. 8 (Aug. 1988); pp. 35-42.

"Consulting Without Consultants: Expert Systems Applications in User Services"; ACM SIGUCCS XV11 (1989); pp. 335-341.

Office Action dated Sep. 18, 2009 for U.S. Appl. No. 10/679,192.

Office Action dated Mar. 19, 2010 for U.S. Appl. No. 12/476,285.

Office Action issued against U.S. Appl. No. 12/476,285 dated Jun. 25, 2010.

\* cited by examiner

EXPERT SYSTEM SUPPORTED INTERACTIVE PRODUCT SELECTION AND RECOMMENDATION

CROSS REFERENCE TO RELATED APPLICATIONS

The present application claims priority pursuant to 35 U.S.C. Sec. 119(e) to U.S. Provisional Application Ser. No. 60/219,783, filed Jul. 19, 2000, pending, which is hereby incorporated herein by reference in its entirety. The present application also claims priority pursuant to 35 U.S.C. Sec. 120 to U.S. Regular application Ser. No. 09/764,662, filed Jan. 18, 2001, pending, which is hereby incorporated by reference in its entirety.

The following U.S. patent applications are hereby incorporated herein by reference in their entirety and made part of the present U.S. patent application for all purposes:

1) U.S. patent application Ser. No. 09/909,241, entitled "EXPERT SYSTEM ADAPTED TO DEDICATED INTERNET ACCESS GUIDANCE ENGINE," filed on even data herewith.
2) U.S. patent application Ser. No. 09/909,240, entitle "EXPERT SYSTEM ADAPTED DATA NETWORK GUIDANCE ENGINE," filed on even date herewith.

BACKGROUND

1. Technical Field

The present invention relates generally to expert systems; and, more particularly, it relates to expert system supported interactive product selection and recommendation.

2. Related Art

Within conventional systems and methods that are operable to perform product selection and recommendation, a key limiting factor is the skill level of the agent or user who performs the customer or client interaction is selling and marketing those products. Within the scope of products, services are also envisioned as well within the context of the generic label "product." Regardless of the industry, the skill level of the agent in communicating the available products to a customer and, as is oftentimes the case, educating the customer and helping him to quantify his needs, are limiting factors that govern the degree of effectiveness that a particular salesperson can achieve. Within technology areas that are more amorphous and complex, the limitations of salespeople are even further compromised.

There have been a number of technology areas where the availability of adequately skilled salespersons has been limiting to the full tapping of the market. As one example, the Internet has rapidly become an indispensable system that many businesses require simply to conduct their day-to-day affairs. During Internet access blackouts within such industries, when the access to the Internet has been temporarily interrupted, it is evident the degree to which businesses have grown dependent on the availability and reliability of such services. Yet, as is often the case, there are relatively few individuals within the company who are able to seek adequate Internet services to meet the needs of their business. While there is this sometimes great limitation of sufficiently skilled individuals within customer-businesses that seek such services, when there are not sufficiently skilled and trained salespeople, or agents, to sell those services, the problem becomes ever more complex. The likelihood of a sufficient solution that will adequately satisfy the needs of the customer is relatively low.

The conventional solutions have been geared towards training the salespeople in such situations to a level at which they can adequately communicate and understand the technology that they are seeking to sell. This approach, while being effective for a particular individual once that individual is sufficiently trained, is catastrophic for an industry that has a high degree of turnover. In the example used above to illustrate the deficiency of this traditional approach, the turnover rate of individuals, once they have acquired a high skill level, is oftentimes astronomical. There is such a high need for specifically trained individuals in these key technology areas that the lateral opportunities are sometimes to good to pass up. Moreover, the problem is further complicated by the fact that companies in the business of selling such goods and services, namely providers, are loathe to invest a high degree of money and effort to train their work base in light of the radical degree of turnover within the industry. Another limitation within conventional approaches is the turn around time simply to provide a prospective customer with a list of available and operable options that may meet his needs. In some industries, given the high degree of technical complexity, there may be a turn around time of several weeks before a customer even gets an estimate or recommendation of products that may serve his needs. This latency is oftentimes extremely costly in terms of getting work up and running.

The frustration of customers who seek such products and services, when forced to deal with the all too often poorly qualified salespeople within their given industry, leads to an interaction that is less than effective. Oftentimes, both parties leave an interaction with a high degree of frustration. The conventional solution of simply trying to train the sales force to a sufficiently high level so as to accomplish this desired effectiveness has simply been deficient in light of many of the intrinsic limitations of the high technology industries. Moreover, even within relatively low technology level industries, there is oftentimes a great deal of "expert knowledge" that must or should be acquired before making an effective salesperson. Within these industries as well, the limitations of the skill level, experience, and expertise of the agent (salesperson) is often the limiting factor in the overall effectiveness of the solution.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a method used to perform product selection and recommendation using an expert system. The method includes determining problem domain information, determining need information of a user, inputting the user need information into the expert system, transforming the user need information into a trait, and rating a product within the number of available products using the expert system. The trait is characteristic of a product of relevance to the user using the expert system. The product of relevance is selected from the available products.

In certain embodiments of the invention, the method is performed when an agent determines the need information of the user and inputs the user need information into an expert system via a graphical user interface. The business may also further include summarizing the ratings of the available products and providing explanation of the ratings of the available products. The summary of the ratings of the available products may be presented in various forms including listing of a recommended solution, a compatible solution, and a not recommended solution. Again, the generic use of the terminology product includes both products and services. The method may also include communicating the rating from the agent to a customer in situations where the rating of the product is performed in real time. The expert system employs a fuzzy value in performing rating of the product. Other values, including crisp values, may also be used by the expert system.

Other aspects of the present invention can be found in an expert system that is operable to facilitate interactive product selection and recommendation. The expert system includes an available products/services database, an expert system that is communicatively coupled to the available products/services database, and an agent interface that permits an agent to access the functionality of the expert system. The expert system performs processing using an available product within the available products/services database and a customer's need to rate the available product.

In certain embodiments of the invention, the expert system further includes a computer network that is communicatively coupled to the expert system, and the agent is able to perform remote access of the functionality of the expert system via a graphical user interface that communicatively couples to the computer network. The expert system may be supported locally on a platform that also supports the agent interface. It may alternatively be supported remotely on any other platform that the agent may access via the computer network. The expert system performs dynamic calculation to perform the rating of the available product. The agent is able to interact with a customer in real time, and the agent can communicate information corresponding to the rating of the available product to the customer. The expert system may further include a computer network communicatively coupled to the available products/services database such that the available products/services database is updated in real time, via the computer network, with information of products/services that are provided by a plurality of providers.

Other aspects of the present invention can be found in a method to perform interactive product selection and recommendation. The method includes inputting a customer need into an expert system via a graphical user interface, performing expert system processing considering the customer need in light of business specific options, and generating output that identifies a recommended solution using dynamic calculation within the expert system by employing a fuzzy variable used to characterize the customer need. The recommended product solution is selected from the available products.

In certain embodiments of the invention, the available products include telecommunication technologies. Those telecommunication technologies may also include Internet access services and/or data network services. The method may also be performed where the inputting of the customer need into the expert system via the graphical user interface is performed during real time interaction between an agent and the customer. The generated output may also include a compatible solution, among other types of output.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments is considered in conjunction with the following drawings.

DETAILED DESCRIPTION OF THE INVENTION

Figure 1:
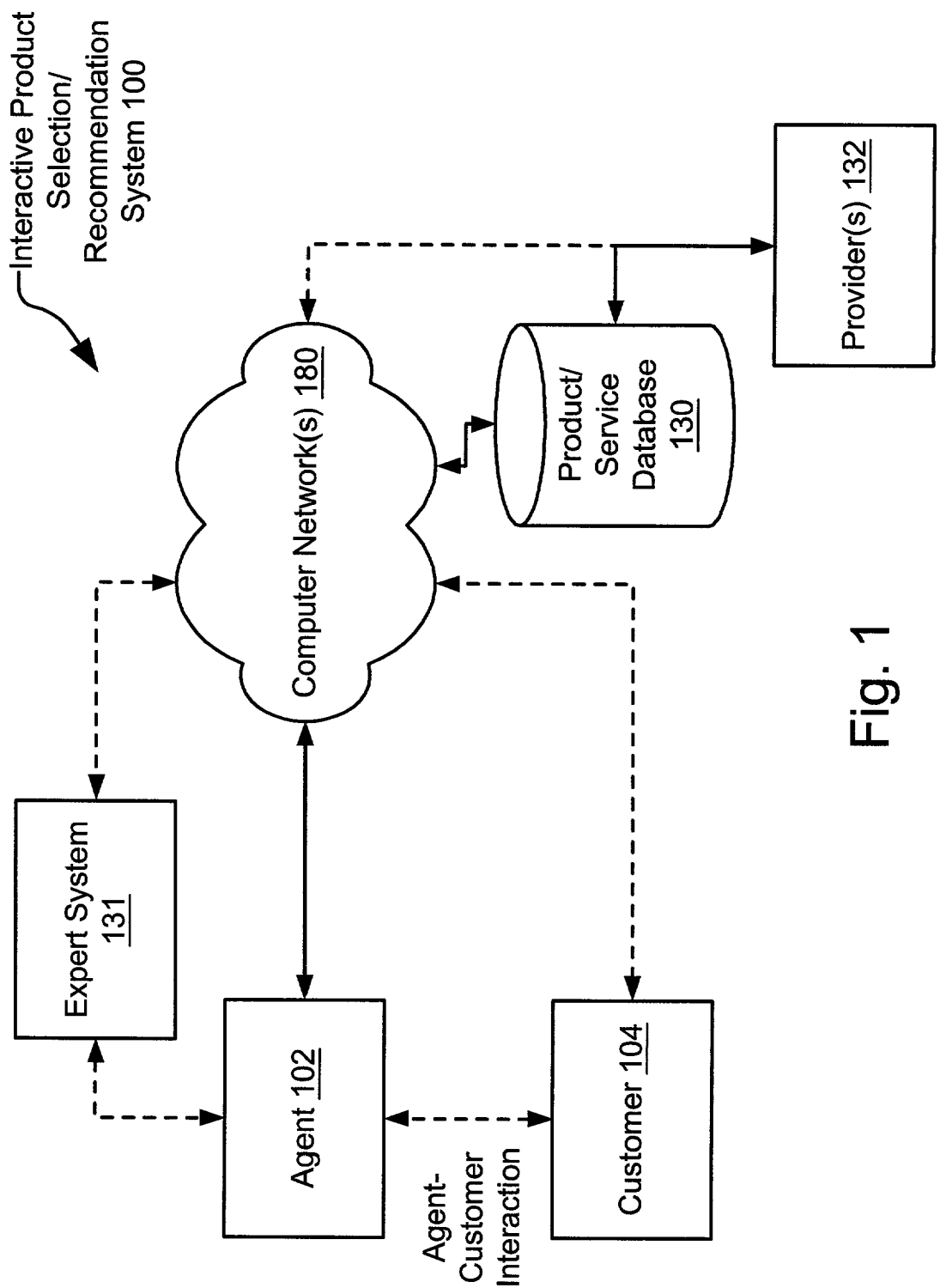
FIG. 1 is a system diagram illustrating an embodiment of an interactive product selection/recommendation system built in accordance with the present invention.

Within all of the various embodiments of the invention described below, the use of terminology of product or products is intended to include both services and products. The generic use of the term "products" or "product" is in no way to limit the operability of various aspects of the invention, as it is equally applicable within both industries selling and providing services, as well as those selling and providing products or combinations of services and/or products. For brevity, the term product is sometimes used instead of goods and/or services.

The invention is operable to allow and assist an agent to select certain solutions to meet the needs of a customer. In one embodiment, the invention is operable to help an agent select telecommunication technologies and products based on customer needs. In light of the comments made above regarding products and services, telecommunication technologies is also included within the scope and spirit of the terminology of "products and services" or simply, "products." The invention employs functionality offered within fuzzy logic expert systems. From certain perspectives, various aspects of the invention are based on fuzzy logic expert systems.

To assist an agent to select an amenable product for a customer, the problem domain must first be determined. The problem domain is the general area where the customer needs a solution. For example, Internet access would be one problem domain. Another one would be local data services. There are numerous problem domains where the functionality of the invention may assist an agent to find a customer solution. Once the problem domain is determined, the agent may then be presented with a set of questions relating to the needs of the customer with respect to that problem domain. The customer's answers are then transformed into values for each element of a set of product traits. In addition, the relative importance of each of the traits, from a customer's perspective, may also be considered.

A trait is a characteristic of a product of relevance to the user. These traits include any number of parameters and may include measurements such as cost, bandwidth, reliability, availability, etc. Each trait that is measurable in a continuum is represented as a fuzzy variable. Other traits are not measurable in a continuum, but are rather better represented as crisp values. One such example of a crisp value is the need for static IP addresses or the location of the site. These are represented with non-fuzzy values (crisp values). An expert system built in accordance with the invention then takes the collection of these values that represents the needs of the customer (one per trait, called needs) and attempts to match them against the corresponding collection of values provided by each product (called specs). Based on this, the expert system is operable to obtain a collection of ratings: one rating for each combination of product and trait. The expert system is also operable to summarize the ratings to give each product a summary rating. The summary rating of each product are used to sort them and classify them with respect to the level of recommendation assigned to each product.

In determining success of the operation of an expert system built in accordance with the invention, one consideration is that a customer belong to a set of "satisfied customers" once they deploy a solution suggested by an agent. In traditional set theory, an element either belongs to a set or does not. So, if customer satisfaction were treated in such a manner, then customers would either be "satisfied" or "dissatisfied." However, customers are rarely 100% satisfied or 100% dissatisfied. Their satisfaction usually falls somewhere in the middle.

The invention is operable using Fuzzy Sets. In Fuzzy Set Theory, an element does not have to belong to a set 0 or 100%. Instead, an element may belong to the set to a given degree. This type of model provides a lower semantic gap when working with sets that don't have precise mathematical definitions (as many don't). In fuzzy sets, each set has a corresponding membership function that maps all elements from the Universe of Discourse to a real number in the range [0, 1]. If the membership function maps an element to 1, then it completely belongs to the corresponding set. If it maps an element to 0, then it does not belong to the set at all. Other values provide a more fuzzy definition of whether the element belongs to the set. In the example of customer satisfaction, the membership function determines the level of satisfaction of a customer.

In many problems, the Universe of Discourse is a range of real numbers. As some examples: bandwidth, cost and reliability traits are all measurable and can be represented by real numbers. So, as an example, a fuzzy set may be created to represent the level of satisfaction of a customer who uses ISDN using the following membership functions as the spec of the ISDN product:

$P(x)=1$ for $x<=48$ $P(x)=2-x/48$ for $48<x$ and $x<96$ $P(x)=0$ for $x>=96$

Where x is measured in kbps. ISDN has a bandwidth of 64 kbps and in this case, the domain expert who came up with this membership function estimates that customers who need a bandwidth of 48 kbps or less will be completely satisfied with ISDN. Customers that need a bandwidth between 48 kbps and 96 kbps will have a linear reduction in their level of satisfaction. Finally customers who need 96 kbps or more will be completely dissatisfied with this solution. Presumably, we will be able to obtain this type of information from domain experts. This particular fuzzy set is meant only as an example.

On the other hand, the bandwidth requirements for a customer can rarely be estimated precisely. So, a fuzzy set can also be used to represent the bandwidth need of a customer:

$N(x)=0$ for $x<=50$ $N(x)=x/10-5$ for $x>50$ and $x<=60$ $N(x)=-x/10+7$ for $60<x$ and $x<=70$ $N(x)=0$ for $x>70$ This set represents a customer whose bandwidth need is estimated to be between 50 and 70 kbps. The set peaks at 60 kbps because it is the most likely bandwidth requirement. One assumption may be made: if the fuzzy set that represents a customer need is a subset of what is offered by a product, then it may be assumed that the customer will be perfectly satisfied. It may also be determined if there is no overlap, then the customer will be completely dissatisfied. If there is partial overlap there will be partial satisfaction. Fuzzy logic provides rules to determine the level of satisfaction.

There are at least three practical considerations that affect how fuzzy sets are represented. First, since fuzzy sets deal with concepts that are difficult to pin down, it is rare to come up with complex membership functions. Second, in order to simplify calculations, fuzzy sets are commonly defined with a set of linear functions. Third, although it is relatively easy to come up with equations for line segments, it quickly becomes bothersome. So, a common notation for fuzzy sets is shown as follows:

FUZZY-SET::=[POINTS]
POINTS::=POINT|POINT POINTS
POINT::=Y/X
Y::=<a number in the interval 0.0 to 1.0 inclusive>
X::=<any number>

The first $y_0/x_0$ point delimits a horizontal line from (−infinity, $y_0$) to ($x_0$, $y_0$). The last $Y_n/x_n$ point delimits a horizontal line from ($x_n$, $y_n$) to (infinity, $y_n$). All other consecutive points ($x_i$, $y_i$) ($x_{i+1}$, $y_{i+1}$) delimit straight lines.

As examples, the 2 membership functions defined above could be written as:

ISDN-BANDWIDTH-SATISFACTION=[1/48 0/96]

CUSTOMER-BANDWIDTH-NEEDS=[0/50 1/60 0/70]

Fuzzy sets defined with 2 coordinates are called Z Fuzzy Sets when $y_0>y_1$. They are called S-Fuzzy Sets when $y_0<y_1$. This is in reference to the shape of the membership function. There are also triangular, rectangular and trapezoidal fuzzy sets, where the name is assigned based on the shape of the membership function.

In an expert system built in accordance with the invention, the use of Z and S Fuzzy Sets to define each trait of each product may be employed. For example, for traits where higher numbers are preferable, such as bandwidth and reliability (measured as MTBF or mean time between failures), a Z Fuzzy Set is used. For traits where lower numbers are preferred, such as cost or MTTR (Mean Time To Repair), an S Fuzzy Set is used. To represent customer needs we generally use triangular fuzzy sets, although other shapes are allowed and the expert system will work with any arbitrary membership function for any fuzzy set. When the needs of the customer are known precisely or where there are no means to "fuzzify" the needs of the customer, it is valid to use a crisp value to represent its needs. A crisp value is just a special case of a fuzzy value where the membership function evaluates to one on the crisp value and to zero elsewhere.

A common notation in Fuzzy Set Theory is that for a given Fuzzy Set A its membership function is also called A and defined as $A: UOD \rightarrow [0, 1]$ Where UOD is the Universe of Discourse. Using this notation we define the following set operations:

$C = A \cap B$ iff $C(x) = \min(A(x), B(x))$ $\forall x$ in UOD $C = A \cup B$ iff $C(x) = \max(A(x), B(x))$ $\forall x$ in UOD $C = \overline{A}$ iff $C(x) = 1 - A(x)$ $\forall x$ in UOD The height of a set A is h(A) and is defined as the maximum value produced by its membership function.

When the spec of a product P is matched against the need N (where N is a crisp value), for a given trait, the fuzzy logic expert system produces P(N) as the matching measure.

When the spec of a product P is matched against the need N (where N is a fuzzy value), for a given trait, the fuzzy logic expert system proceeds as follows:

Good = $h(P \cap N)$

Bad = $h(\overline{P} \cap N)$

Rating = Good/(Good+Bad)

Rating is the matching measure. The rating formula described above is not in the literature. The customary way of obtaining the level of matching of 2 fuzzy sets is:

$h(P \cap N)$

This is, however, overly optimistic.

The concept of a fuzzy variable is relevant and important as well, because not all fuzzy sets are comparable. For example, a fuzzy set defined to represent the bandwidth of a product and one defined to represent the cost cannot be usefully compared. For this reason there is another concept called fuzzy variable. A fuzzy variable defines a Universe of Discourse. Each fuzzy variable stipulates a name for the UOD as well as its valid range of values and the unit of measurement.

Fuzzy variables in an expert system built in accordance with the invention are used to model traits. For example, to model bandwidth, a fuzzy variable with the domain [0, 100, 000] is created where each unit represents one kbps.

A fuzzy value is a fuzzy set in the context of a fuzzy variable. This is what may be used in the expert system to represent a user need for a given trait or the spec of a product with respect to a given trait. A fuzzy set is like a number (e.g., 50); a fuzzy value is like a number with a unit of measurement and a meaning (e.g., $50 monthly cost.). Various embodiments of the invention that employ an expert system operable according to the parameters described above are further fleshed out as shown in the various Figures and description below.

FIG. 1 is a system diagram illustrating an embodiment of an interactive product selection/recommendation system 100 built in accordance with the present invention. The interactive product selection/recommendation system 100 is operative using any number of computer network(s) 180. The computer network(s) 180 includes a single computer network or any number of computer networks that are communicatively coupled to one another.

A number of provider(s) 132 are able to provide any number of services and/or products to a customer 104. Each of the products that are furnished by the providers 132 is catalogued within a product/service database 130. The product/service database 130 is communicatively coupled to the computer network(s) 180. If desired, the providers 132 are also provided with communicative coupling to the computer network(s) 180 as well.

An agent 102 and the customer 104 interact via any number of communication means including telephone, Internet, or any other operable communication media. The agent 102 is able to access the various functionality of an expert system 131 while interacting with the customer 104. If desired, the agent 102 is able to perform accessing of expert system 131 while offline with respect to the customer 104. For example, the agent 102 is able to perform interaction with the customer 104 initially, then to use the expert system 131 to perform analysis and provide recommendations of what products should be provided to the customer 104. However, in one embodiment of the invention, the agent 102 is afforded the opportunity to perform real time interaction with the customer 104 and to use the various functionality of the expert system 131 to provide recommendation of products provided by the provider(s) 132 that would provide a suitable solution for the customer 104. It is also noted that the customer 104 himself may access all of the functionality of the various aspects of the present invention, in similar manner that the agent 102 access the functionality, in various embodiments as well. That is to say, the customer 104 may be given access to the same functionality that the agent 104 enjoys to the various aspects of the present invention.

The interactive product selection/recommendation system 100 allows for the ability of an agent 102 of relatively low skill level to provide recommendations to the customer 104 of the available products that proffered by the various provider(s) 132, borrowing on the various functionality of the expert system 131. The interactive product selection/recommendation system 100 is amenable to providing sales support for the providers 132 without requiring very highly skilled and trained salespersons within many niche industries that typically require an enormous amount of experience, expertise, and training.

Particularly within industries where there is a gross mismatch between availability of adequate and competent salespeople and the industry's customer demand, the interactive product selection/recommendation system 100 offers a system in which any one of the providers 132 is able to achieve significantly greater customer interaction and sales that that afforded using the conventional methods and systems that necessitate a great deal of training and expertise within a given industry before being able to provide adequate sales servicing. Whereas a conventional system is limited by the individual ability, expertise, and training of an agent operating within it, certain aspects of the invention provide for a system whose high end performance is not limited by the personal characteristics of the agents that operate it.

Figure 2:
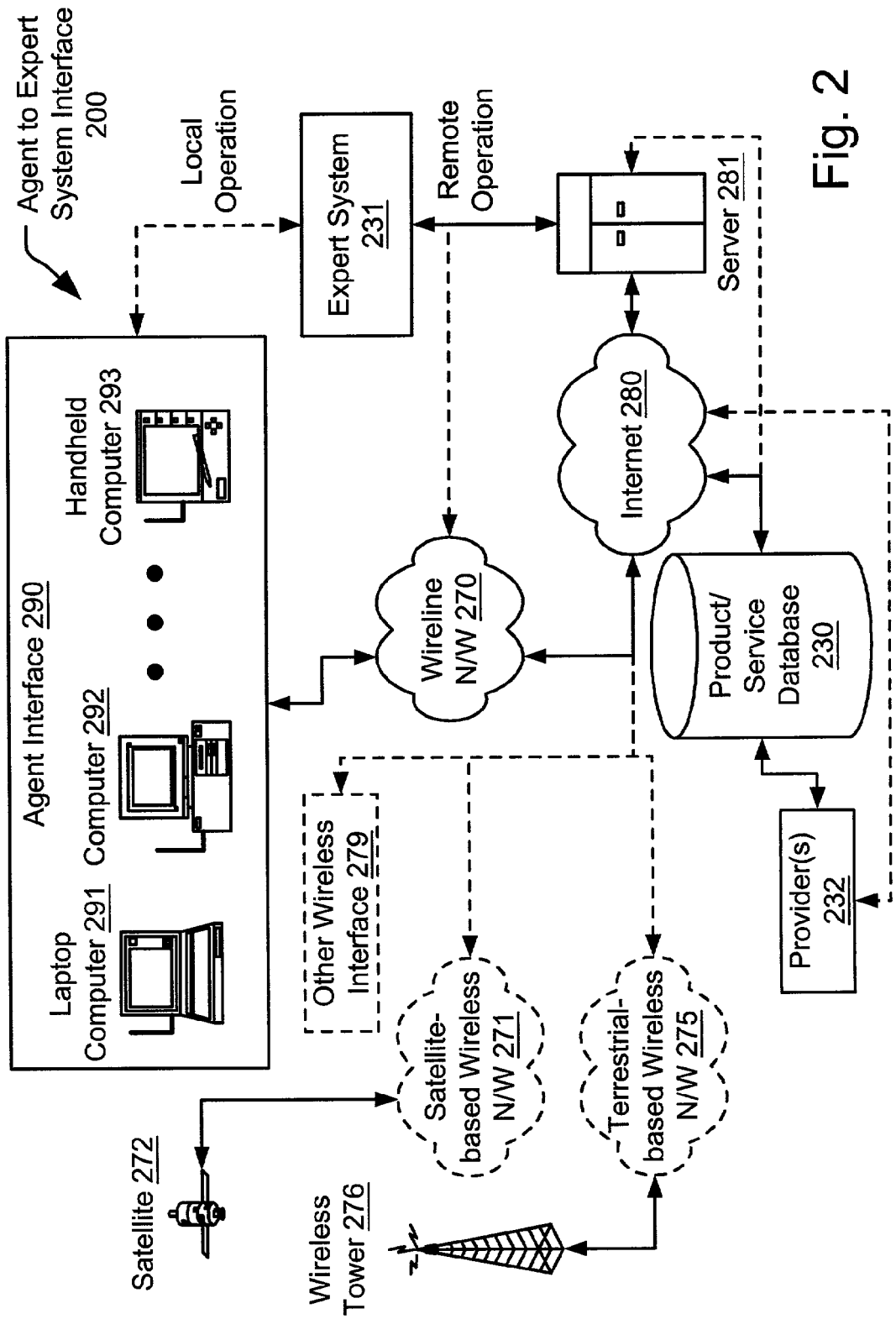
FIG. 2 is a system diagram illustrating an embodiment of an agent to expert system interface that is built in accordance with the present invention.

FIG. 2 is a system diagram illustrating an embodiment of an agent to expert system interface 200 that is built in accordance with the present invention. An agent is able to access an expert system 231 using an agent interface 290. The agent interface 290 includes any number of devices that allows for communicative coupling to the expert system 231. Examples of devices that are all operable as the agent interface include a laptop computer 291, a computer 292, . . . and a handheld computer 293. In addition, any portable device that is operable to perform electronic interaction with the expert system 231 is also operable to serve the functionality of the agent interface 290.

The particular connection to the expert system 231 from the agent interface 290, that thereby allows agent interaction with the expert system 231, is achieved any number of ways without departing from the scope and spirit of the invention. For examples, it may be that the expert system 231 operates locally on the platform on which the agent is using as the agent interface 290. Alternatively, it is run remotely on a server 281 where the expert system 231 is accessed by the agent via any number of electronic connections. For example, the agent interface 290 is operable to access the expert system 231 (supported remotely by the server 281) via a wireline network 270 that communicatively couples the agent interface 231 to the expert system via the Internet. Also, the wireline network 270 may be operable to access the expert system 231 directly, without going through the Internet 280, if the wireline network 270 is operable to communicatively couple to the server 281 on which the expert system 231 is supported.

In even other embodiments, the agent interface 290 is operable to perform wireless connectivity to the wireline network 270 and/or the Internet 280. For example, each of the various platforms may be operable to perform the agent interface 280 may themselves be operable to perform wireless communication, as shown by the antennae on the laptop computer 291, the computer 292, . . . and the handheld computer 293. In such instances, the agent interface 280 is operable to connect to the wireline network 270 and/or the Internet 280. The wireless connectivity may be achieved using a satellite 272 that communicatively couples to a satellite-based wireless network 271, or alternatively using a wireless tower 276 that communicatively couples to a terrestrial-based wireless network 275. Generically, any other wireless interface 279 may be used to communicatively couple the agent interface to one of the wireline network 270 and/or the Internet 280 to allow interaction of the agent with the expert system 231 when the expert system 231 is operated remotely on the server 281. The term "server," for the server 281 is generically used to illustrate any number of computing platforms possessing sufficient processing resources to support the expert system 231.

The expert system 231 is operable also to access a product/service database 230. Again, as mentioned above and as will also be described in various embodiments of the invention below, the product/service database 230 is updated with the available products (including services) that may be sought by a customer. The listings of such available products may be provided via direct link by a number of provider(s) 232, or the providers 232 may provide the information to the product/service database 230 via the Internet 280. In addition, the server, on which the expert system 231 is supported for remote operation, may access the product/service database 230 directly via a dedicated link or via the Internet 280. It is understood that any number of dedicated wireline or wireless based connections, and/or networks, are also operable to perform the communicative coupling of the expert system 231 to the product/service database 230. The FIG. 2 illustrates a number of exemplary embodiments showing the connectivity and interaction of the agent interface 290 with the expert system 231 that allows for real time interaction of an agent with the expert system 231. The ability for real time interaction provides for a highly effective sales system as will be shown and described below in other of the various embodiments of the invention.

Figure 3:
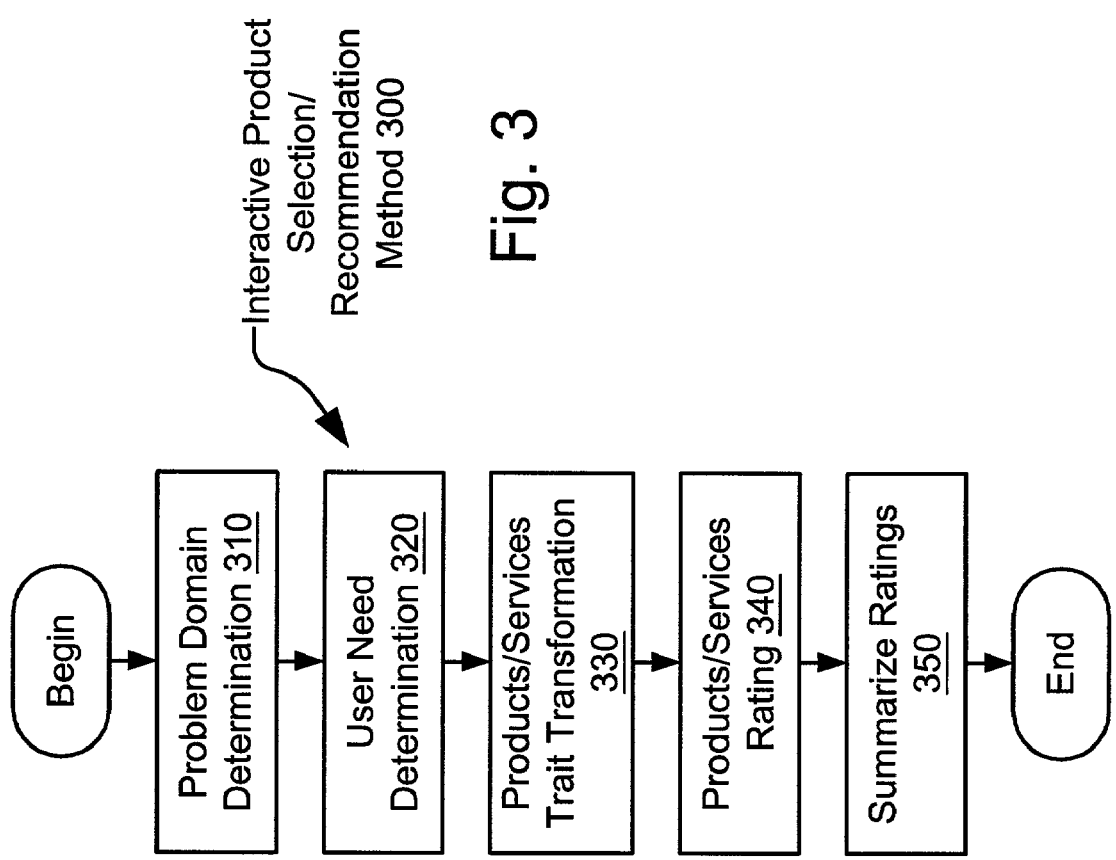
FIG. 3 is a logic diagram illustrating an embodiment of an interactive product selection/recommendation method that is performed in accordance with the present invention.

FIG. 3 is a functional block diagram illustrating an embodiment of an interactive product selection/recommendation method 300 that is performed in accordance with the present invention. Initially, problem domain determination is performed as shown in a block 310. Subsequently, the user's, or customer's, need (or needs) are determined as shown in a block 320. Then, for proper processing within an expert system that is operable using various aspects of the invention, the available products/services and the user needs are used to perform trait transformation as shown in a block 330. During expert system processing, ratings for the available products/services are provide in a block 340. Ultimately, in a block 350, the ratings are then summarized for use by an agent.

The interactive product selection/recommendation method 300 is operable in real time where an agent may interact with a customer while inputting the customer's various needs and the agent can then provide recommendation to the customer. This recommendation is based on the customer's provided needs against the backdrop of the available products that are available to him. It may be that given the geographical location of the customer's site or sites that only a predetermined number of services are available to him. Such limitations are inherently provided for within the products/services rating that is performed in the block 340. As will also be shown in various embodiments of the invention below, the ratings summary provided for in the block 350 is able to also provide the underlying reasoning of why a particular solution is being recommended over other competing solutions. There is even greater detail provided, in certain embodiments, where compatible solutions are presented to the agent to provide for a more educated recommendation to a customer. In addition, detailed description of the available products is also available to a user of the interactive product selection/recommendation method 300 as well.

Figure 4:
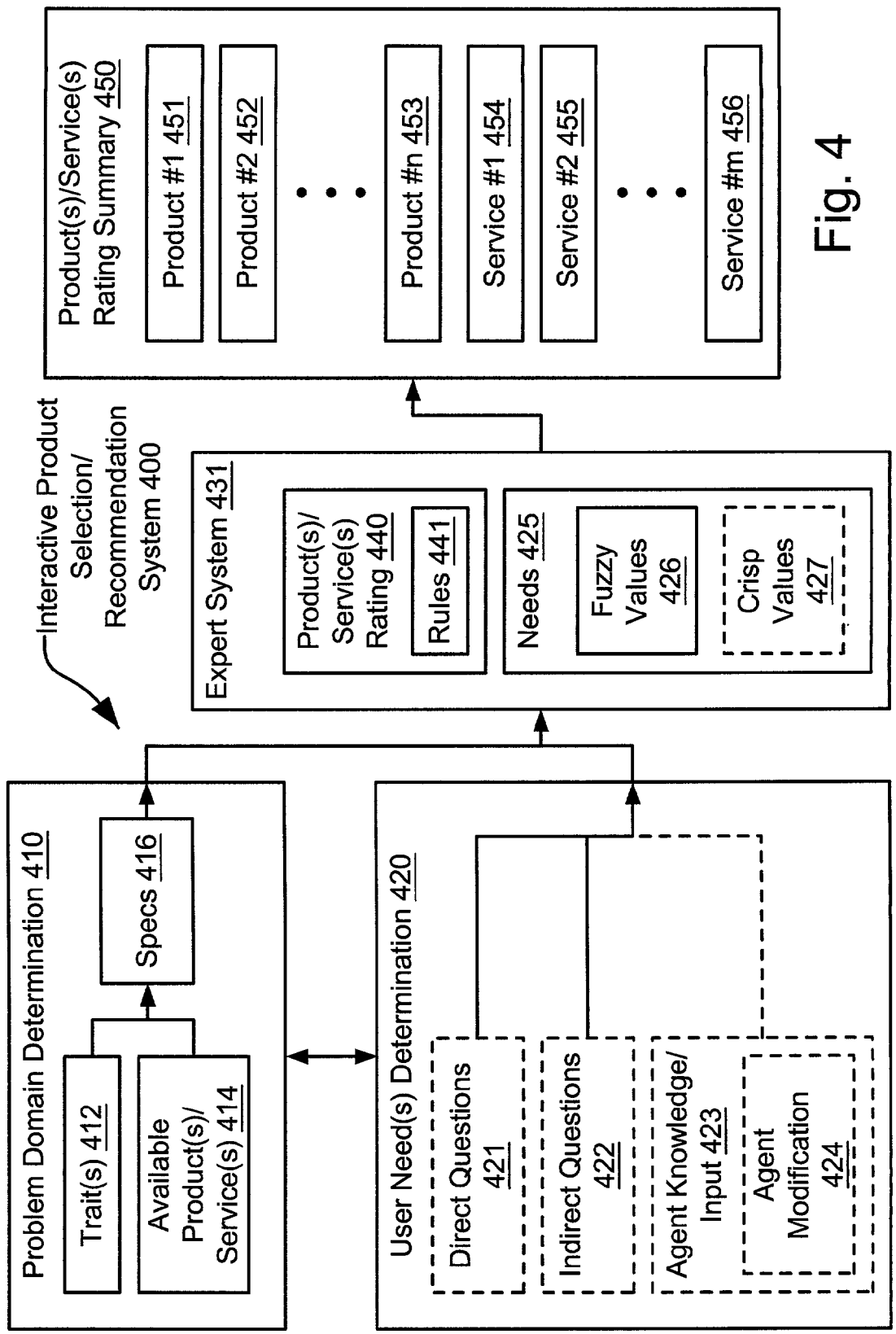
FIG. 4 is a system diagram illustrating another embodiment of an interactive product selection/recommendation system built in accordance with the present invention.

FIG. 4 is a system diagram illustrating another embodiment of an interactive product selection/recommendation system 400 built in accordance with the present invention. Within the interactive product selection/recommendation system 400, problem domain determination is illustrated in a functional block 410. The problem domain determination 410 is performed cooperatively within the context of user need(s) determination as shown in a functional block 420. These two functional blocks operate cooperatively to provide input for an expert system 431 that is operable to provide for a product(s)/service(s) rating summary 450.

Within the problem domain determination functional block 410, an indefinite number of trait(s) 412 and available product(s)/service(s) 414 are used to generate specs 416 that are used as input to the expert system 431. The traits 412 is a characteristic of a product and/or service that is relevant to a particular customer. The available product(s)/service(s) 414 also provide even greater detailed information of the various available product(s)/service(s) for the user of the interactive product selection/recommendation system 400. This greater detailed information may be accessed via a link, or selectable option, or in any manner known in the art.

This is correlated to the user need determination performed in the block 420. The user need determination 420 may be performed using a number of means including asking the customer direct questions 421 and indirect questions 422. In addition, the agent using the interactive product selection/recommendation system 400 is bound to posses some degree of knowledge, though it is understood that a novice or very inexperienced user (agent) may nevertheless use the interactive product selection/recommendation system 400 as well. In situations where the agent does posses a degree of knowledge, expertise, and skill, the agent's knowledge/input 423 may also be used to perform the user need determination 420. The agent may also make modifications of a number of default user needs as shown by a block 424. The agent may use the agent modification block 424 to override system input when his experience or skill level suggests doing so.

After using any of these various means to acquire knowledge, the user's needs determination block 420 provides input to the expert system 431 where the expert system 431 uses this information, along with information from the problem domain determination block 410, to generate user's needs as shown in a block 425. Within the context of expert systems, an indefinite number of fuzzy values 426 are generated. In certain instances, there are situations where a user need must be represented by a crisp value 427, or hard/rigid value. There are other instances are where no crisp values are used at all. An example of such an instance is where questions posed by an agent to a customer do not permit the user to convey a level of uncertainty. In such instances, that particular need or needs should be represented by crisp values 427. Another example of a situation that would best be represented by a crisp value 427 would be the actually availability of certain products in a given location. There may be a situation where only certain services are available in a particular city; such a situation is better represented using crisp values 427.

To state the concept of a crisp, or non-fuzzy value, in another way, some product traits are not measurable in a continuum. For those product traits that may not be represented or are not measurable using a continuum, a crisp value may be used. For example, the customer's physical location and the need for a static IP addresses have a bearing on the recommended product. These traits are not fuzzy. So, take support for static IP address, either a product supports it or not. If a product does not support it and the customer needs it, then, for this trait, the level of customer satisfaction is marked as zero. How this is summarized depends on the relative importance of this trait. The main difference with fuzzy traits is that for crisp traits traditional logic is used and in most cases it may be concluded that the customer is either 100% satisfied or 0% satisfied.

As mentioned briefly above, the specs 416 and the needs 425 are used as inputs to the expert system 431. The expert system 431 performs product(s)/service(s) rating 440 using an indefinite number of rules 441. The product(s)/service(s) rating summary 450 includes a ranking of an indefinite number of products and services, shown as a product #1 451, a product #2 452, . . . , and a product #n 453 and a service #1 454, a service #2 455, . . . , and a service #m 456. For a given problem, a sorted set of classified solutions is returned. The classification includes the level of customer satisfaction achieved by the product. There is a natural bifurcation of performing ratings of services in one instance, and performing ratings of products in another. However, there may be some instances where a product coupled with some services may also be rated. In addition, if the problem requires a product and a service, then the returned solutions will be configured with a specific set of products and a specific set of solutions.

There are many permutations in which the product(s)/service(s) rating summary 450 may be provided to an agent without departing from the scope and spirit of the invention. In one embodiment, the product(s)/service(s) rating summary 450 is provided in a document type of format that an agent may subsequently modify. One such example is the outputting of the product(s)/service(s) rating summary 450 into an MS WORD document that an agent may then edit before forwarding a report onto a customer.

Figure 5:
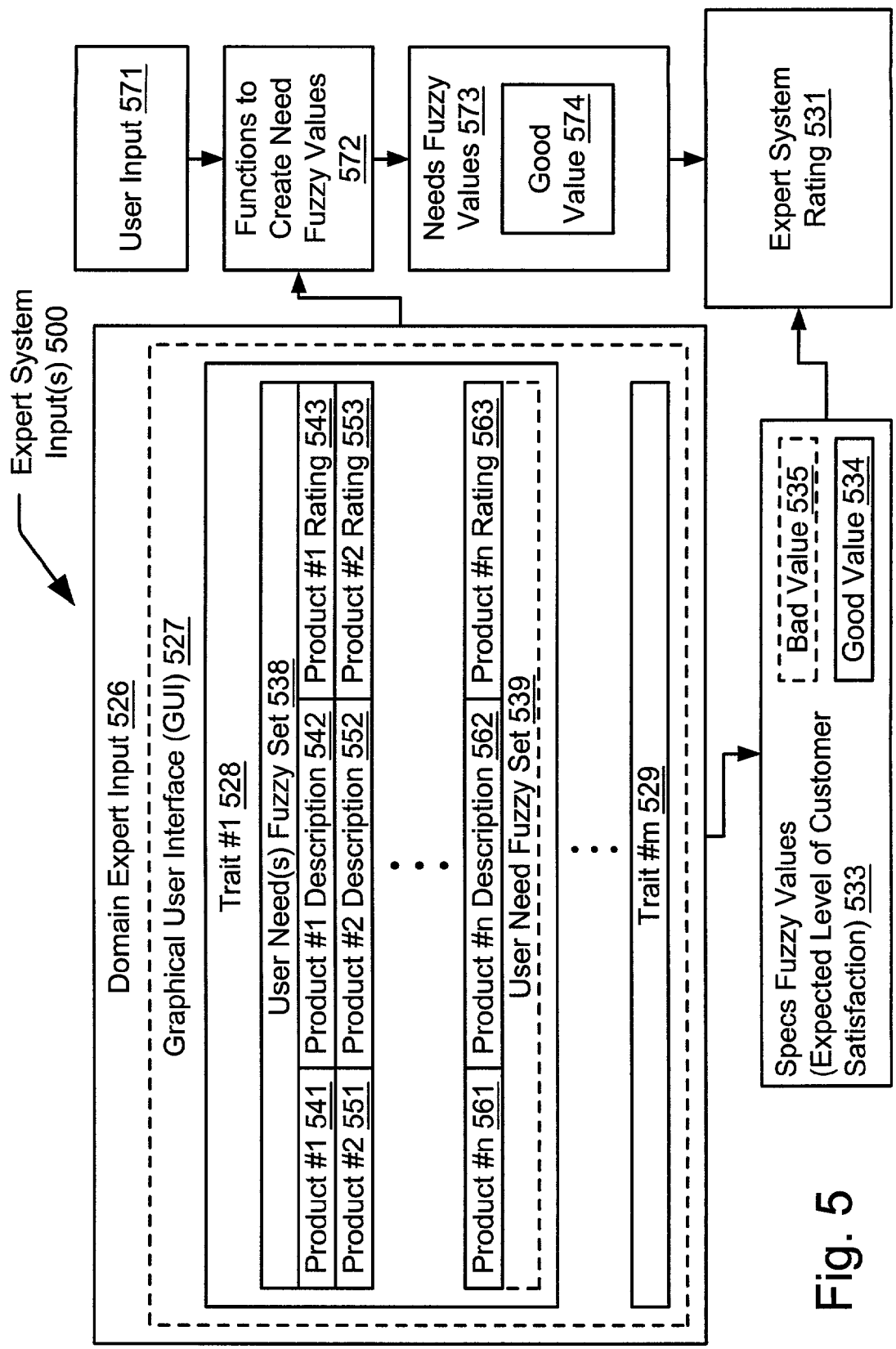
FIG. 5 is a block diagram illustrating an embodiment of some of the inputs that are usable within an expert system that is built in accordance with the present invention.

FIG. 5 is a block diagram illustrating an embodiment of some of the inputs 500 that are usable within an expert system that is built in accordance with the present invention. In this illustrated embodiment of expert system inputs 500, an optional graphical user interface 527 may be used to perform the expert system inputs 500. Alternatively, a file could be generated containing all of the information for use in an expert system. The GUI 527 is perhaps a more user-friendly manner to perform such inputs, especially in the context of lower skilled users of the expert system. The expert system takes in this information to perform expert system rating 531 using a number of inputs, including those that are provided by a user and by a domain expert. A user of the expert system is able to provide user input as shown in the functional block 571. In addition, the domain expert is able to provide his input via the functional block shown as domain expert input 526. Both the user input 527 and the domain expert input 526 are used to control and modify the functions used to create needs fuzzy values 573 for use within the expert system to perform expert system rating 531, as shown by the functional block 572. The needs fuzzy values 573 include a good value 574. These needs fuzzy values 573 are then provided to the expert system.

Similarly, the domain expert input 526 generates specs fuzzy values 533 that are also provided to perform the expert system rating 531. The specs fuzzy values 533 are representative of the expected level of customer satisfaction for the various information provided via the domain expert input 526. The specs fuzzy values 533 include a good value 534 and an optional bad value 535. The bad value may simply be the complement of the good value 534 in certain embodiments of the invention. These specs fuzzy values 533 are then provided to the expert system to perform expert system rating 531.

As mentioned above, the GUI 527 illustrated in this embodiment is illustrative of one manner in which the domain expert input 526 may be input into the expert system to perform expert system rating 531 that is operated using various aspects of the invention.

The GUI 527 may be presented as a table that the domain expert input 527 may use. For any number of traits, shown as a trait #1 528, . . . and a trait #m 529, various information may be provided in the tabular format. For example, as illustrated for the trait #1 528, a user need(s) fuzzy set may be located at the top (user need(s) fuzzy set 538) or bottom (user need(s) fuzzy set 539) of the table, as desired in a given situation. The table may be arranged showing the available products, followed by their description, and subsequently by their rank. This is shown graphically as a table arranged from left to right and top to bottom as follows: ($1^{st}$ line) product #1 541 followed by a product #1 description 542, followed by a product #1 rating 543; ($2^{nd}$ line) product #2 551 followed by a product #2 description 552, followed by a product #2 rating 553; . . . ($n^{th}$ line) product #n 561 followed by a product #n description 562, followed by a product #n rating 563. Other variations of the GUI 527 may be used without departing from the scope and spirit of the invention. The GUI 527 is exemplary one just one embodiment that is operable to achieve the domain expert input 526 in a user-friendly manner.

Figure 6:
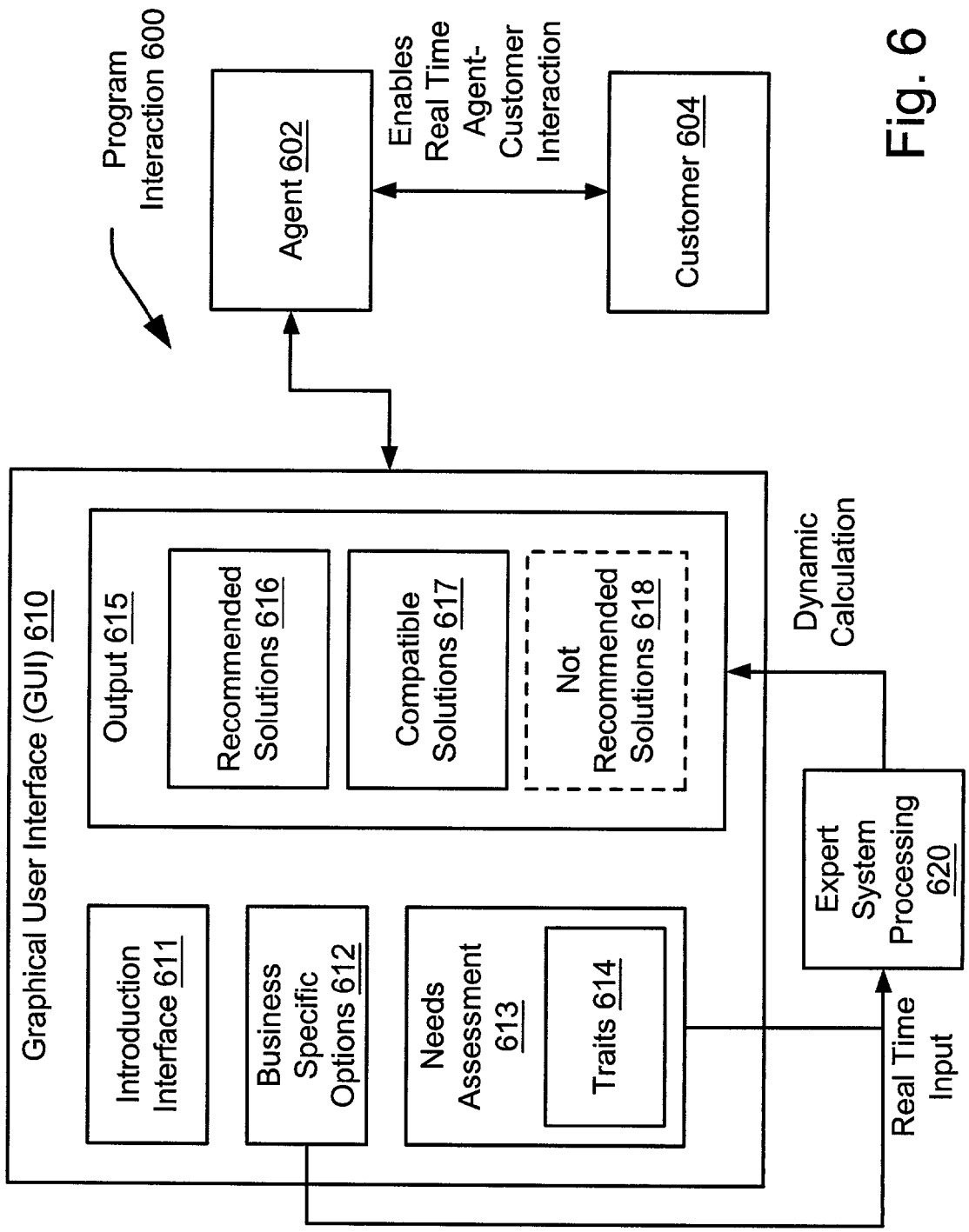
FIG. 6 is a block diagram illustrating an embodiment of program interaction with an expert system that is built in accordance with the present invention.

FIG. 6 is a block diagram illustrating an embodiment of program interaction 600 with an expert system that is built in accordance with the present invention. An agent 602 and a customer 604 are able to interact in real time while the agent 602 has access to the functionality of an expert system that is used to provide recommendations for the agent 602. The agent 602 is afforded access to the expert system via a GUI 610. The GUI 610 walks the agent 602 through a number of intuitively placed screens that assist him in providing effective recommendations to the customer 604. An introduction interface 611 is initially used when the agent 602 begins to invoke the functionality of the expert system that is accessed via the GUI 610.

The agent 602 is able to interact with the customer 604 in real time to perform input of business specific options 612 and to assess the needs of the customer 604, as shown by the needs assessment functional block 613. The business specific options 612 may include additional information regarding the various available products. As described above, any number of traits 614 may be used to perform the needs assessment. The expert system is able to receive these inputs from the business specific options 612 and the needs assessment functional block 613, including the traits 614, in real time. They are then provided to an expert system processing functional block 620. Then, the expert system provided output 615 is displayed via the GUI 610 after performing dynamic calculation. The limiting latency here is the latency of the connectivity between the GUI 610 and the expert system that is used to perform the expert system processing 620. The expert system processing is performed in nearly real time, having sub-second calculation time.

The output 615 includes recommended solutions 616, compatible solutions 617, and (if desired) not recommended solutions 618. In addition, within certain embodiments, an explanation is available for the agent 602 to describe even further the reasons why the particular solutions have been categorized into the various categories, namely, the recommended solutions 616, the compatible solutions 617, and the not recommended solutions 618. This can be most helpful during interaction with the customer, particularly when the customer desires a little more clarification of why a certain solution was recommended and why another was not. The real time input and dynamic calculation offered by the expert system built in accordance with the present invention allows the agent 602 to perform the entire fielding and servicing of a potential client during a single interaction. Compare this with the oftentimes multi-week-long turnaround in getting a customer a recommendation using conventional approaches. As an example, during a single telephone conversation between the agent 602 and the customer 604, the agent 602 is able to input all of the requisite information that the expert system requires. During the same telephone conversation, after the very short duration expert system processing 620, the agent 602 is able to provide virtually immediate recommendation to the customer 604.

The practically real time interaction that is afforded to the agent 602, as well as the explanation that is provided for the various options within the output 615, allow for a relatively inexperienced agent to perform recommendation for the customer 604. The agent 602 may lean on the offered functionality of the system to fill his deficiencies in terms of skill, expertise, and experience within the particular product area. The invention is also very desirable for product providers because they are able to employ relatively low skill level personnel to perform the selling of their products and/or services. This can ensure a greater profitability. Particularly within areas where there is a high degree of turnover, the invention allows a solution where a consistent level of expertise if proffered to the customer 604. In addition, in contexts where a high degree of skill is required to perform the sale of such products and/or services, a provider need not invest such a large amount of up-front effort to get a prospective employee into a position where he may be an effective salesperson or agent.

Figure 7:
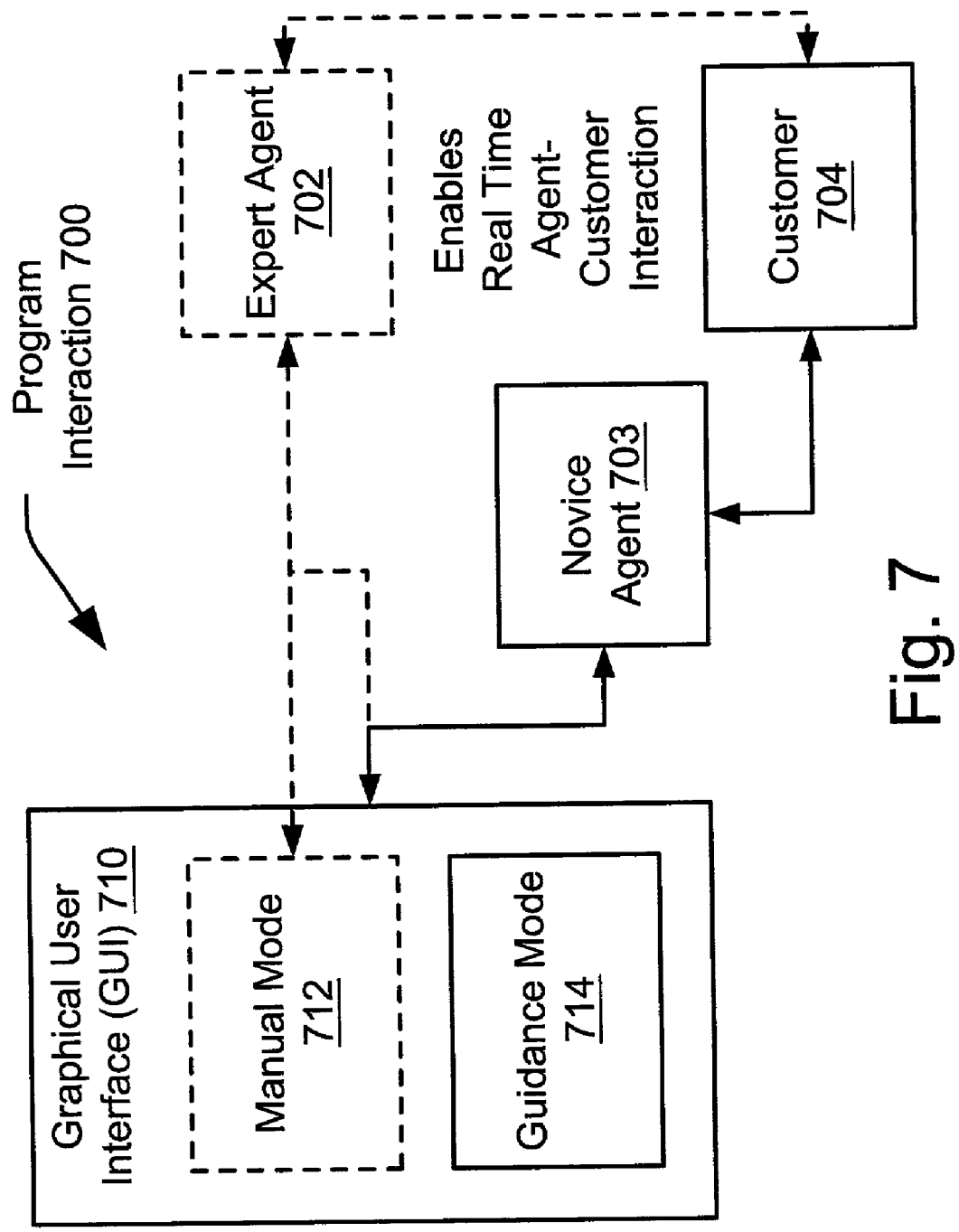
FIG. 7 is a block diagram illustrating another embodiment of program interaction with an expert system that is built in accordance with the present invention.

FIG. 7 is a block diagram illustrating another embodiment of program interaction with an expert system 700 that is built in accordance with the present invention. As described in the many variations of the invention shown above, and many that will be shown below as well, the invention is operable using agents of varying degrees without suffering deleterious effects from a customer perspective. As described above, the invention is operable without requiring a highly skilled or trained agent, as is typically required in solutions using conventional approaches.

The FIG. 7 shows a GUI 710 that allows operation for an agent in a number of multiple modes. Two exemplary modes are those of an (optional) manual mode 712 and a guidance mode 714. If desired, the invention is variable or adaptable depending on the skill level of an agent who desires to employ an expert system in accordance with certain aspects of the present invention. For example, a novice agent 703 may be allowed to access only the guidance mode 714 of the GUI 710 whereas an expert agent 702 may be allowed to access both the guidance mode 714 and a manual mode 712. A customer 704 is able to interact with any agent who employs the expert system, regardless of whether the agent be the novice agent 703 or the expert agent 702. As described above in various embodiments as well as within this embodiment, this interaction may be performed in real time agent-customer interaction.

The manual mode 712 allows for an agent to override any expert system processing. That is to say, the manual mode 712 allows an agent to operate using the GUI 710 in a manner analogous to that employed within conventional approaches, such as allowing the agent to perform the selection of products based on his own knowledge, expertise, and experience. Alternatively, the guidance mode 714 employs the expert system that is operable to perform guidance of the agent through the recommendation/selection process. Within either mode, the guidance mode 714 or the manual mode 712, the product description is made available to the agent to allow for further description of the various available products when interacting with the customer as also described above in various embodiments.

Figure 8:
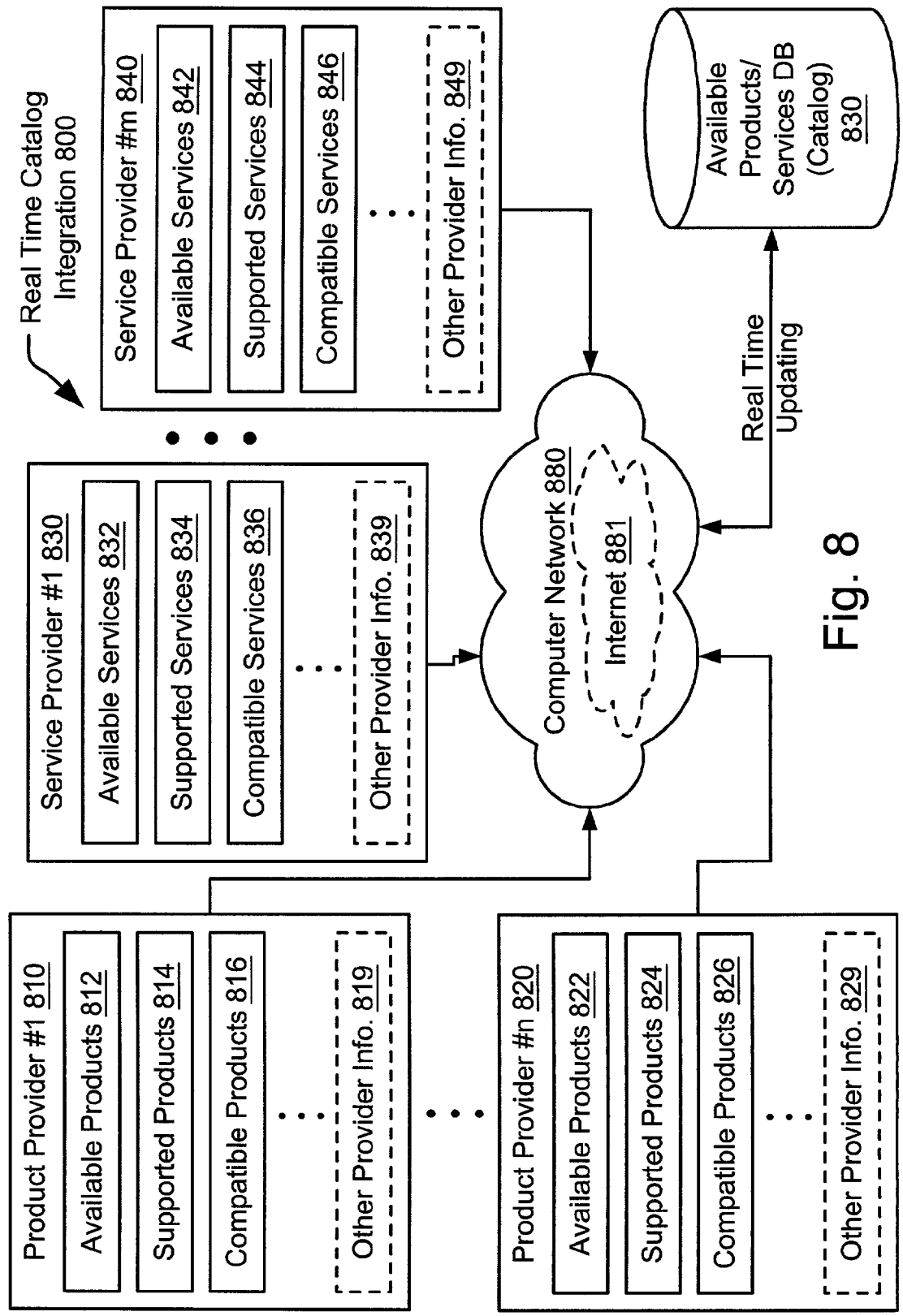
FIG. 8 is a block diagram illustrating an embodiment of real time catalog integration that is achieved in accordance using certain aspects of the present invention.

FIG. 8 is a block diagram illustrating an embodiment of real time catalog integration 800 that is achieved in accordance using certain aspects of the present invention. A computer network 880 is operable to perform real time updating of any number of various service and product providers into an available products/services database (catalog) 830. The available products/services database (catalog) 830 is also communicatively coupled to the computer network 880. The real time updating of the number of various service and product providers into the available products/services database (catalog) 830 ensures that the available products/services database (catalog) 830 is as up to date as the inventories listed for the various service and product providers' databases.

The computer network 880 may include the Internet 881 in certain embodiments of the invention. However, the computer network 880 may also be a dedicated network, such as a local area network (LAN) or other localized network, that is operable to communicatively couple the various service and product providers.

The databases of the various service and product providers are categorized in any number of manners. Exemplary information for the various databases are shown in the embodiment of the FIG. 8. For example, a database for a product provider #1 810 includes information such as a listing of available products 812, a listing of supported products 814, a listing of compatible products 816, . . . and a listing of any other provider information 819. Any number of other product providers may also be used as well without departing from the scope and spirit of the invention. For example, a database for a product provider #n 820 includes information such as a listing of available products 822, a listing of supported products 824, a listing of compatible products 826, . . . and a listing of any other provider information 829.

In addition, any number of service providers may also be integrated into the available products/services database (catalog) 830. For example, a database for a service provider #1 830 includes information such as a listing of available services 832, a listing of supported services 834, a listing of compatible services 836, . . . and a listing of any other provider information 839. Similarly, any number of other service providers may also be used as well without departing from the scope and spirit of the invention. For example, a database for a service provider #m 840 includes information such as a listing of available services 842, a listing of supported services 844, a listing of compatible services 846, . . . and a listing of any other provider information 849. Other information may also be included within the various databases for the various product and service providers without departing from the scope and spirit of the invention.

Figure 9:
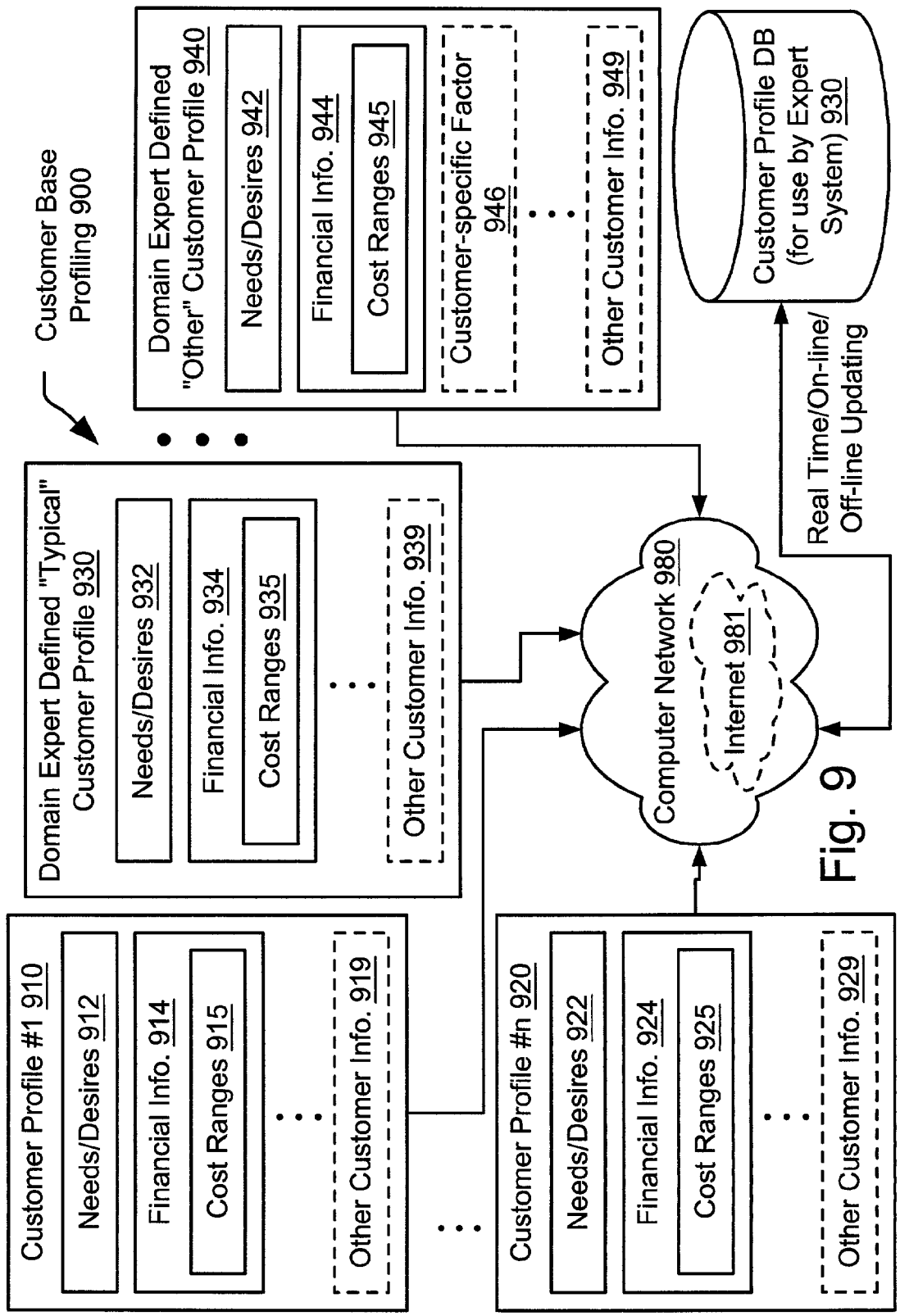
FIG. 9 is a system diagram illustrating an embodiment of customer base profiling that is achieved in accordance using certain aspects of the present invention.

FIG. 9 is a system diagram illustrating an embodiment of customer base profiling 900 that is achieved in accordance using certain aspects of the present invention. The customer base profiling 900 may be performed in an analogous manner in which the real time catalog integration 800 of the FIG. 8 is integrated and performed to generate the available products/services database (catalog) 830.

For example, a computer network 980 is operable to perform real time updating of any number of customer profiles into a customer profile database 930 that is used within an expert system. The customer profile database 930 is also communicatively coupled to the computer network 980. The updating of the number of various customer profiles is performed in any number of manners, including real time, on-line, and off-line, without departing from the scope and spirit of the invention.

The computer network 980 may include the Internet 981 in certain embodiments of the invention. However, the computer network 980 may also be a dedicated network, such as a local area network (LAN) or other localized network, that is operable to communicatively couple the various customer profiles.

The databases of the various customer profiles are categorized in any number of manners. Exemplary information for the various customer profile databases are shown in the embodiment of the FIG. 9. For example, a database for a customer profile #1 910 includes information such as needs/desires 912, financial information 914, . . . and any other customer information 919. If further desired, the financial information 914 may further include information concerning cost ranges 915. In some embodiments, the customer information may include the current services and products that a customer currently has at his disposal. The engines that the expert system employ to perform rating of products and/or services may also include taking this information into account when generating recommendations.

In addition, any number of other customer profiles may also be used as well without departing from the scope and spirit of the invention. For example, a database for a customer profile #n 920 includes information such as needs/desires 922, financial information 924, . . . and any other customer information 929 as well. Similarly, the financial information 924 may further include information concerning cost ranges 925.

In addition, the various customer profiles may also include any number of default or user defined profiles as well. For example, a "typical" customer profile, defined by a domain expert 930, may be used in certain embodiments of the invention. This domain expert defined "typical" customer profile 930 may include similar information as that provided by the customer profiles #1 910, . . . and the customer profiles #n 920. For example, the domain expert defined "typical" customer profile 930 may include information such as needs/desires 932, financial information 934, . . . and any other customer information 939. If further desired, the financial information 934 may further include information concerning cost ranges 935. However, the domain expert defined "typical" customer profile 930 may include different information as well as determined by the domain expert.

The domain expert may also define any number of "other" customer profiles, besides a simple "typical" customer profile. For example, a domain expert defined "other" customer profile 940 may include similar information as that provided by the customer profiles #1 910, . . . and the customer profiles #n 920. For example, the domain expert defined "other" customer profile 940 may include information such as needs/desires 942, financial information 944, . . . and any other customer information 949. If further desired, the financial information 944 may further include information concerning cost ranges 945. In addition, if desired by the domain expert, other factors may also be included as well. A customer-specific factor 946 is also included in certain embodiments of the invention, as determined by the domain expert.

Figure 10:
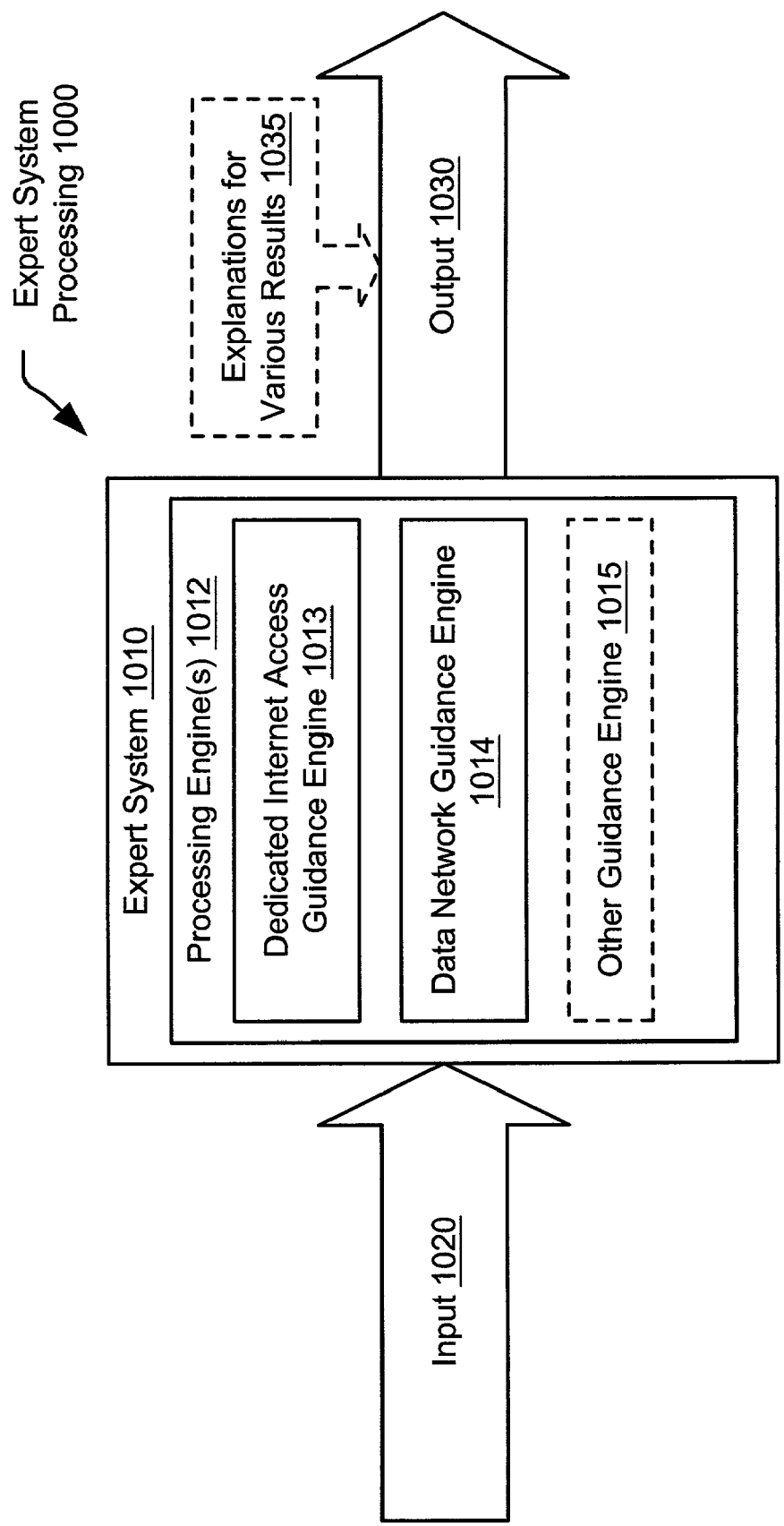
FIG. 10 is a system diagram illustrating an embodiment of expert system processing that is performed in accordance with the present invention.

FIG. 10 is a system diagram illustrating an embodiment of expert system processing 1000 that is performed in accordance with the present invention. Input is provided to an expert system 1010 to provide output 1030. In addition, the expert system 1010 employs a number of processing engine(s) 1012. The processing engine(s) 1012 include a dedicated Internet access guidance engine 1013 and a data network guidance engine 1014. In addition, any other number of guidance engines 1015 may also be employed without departing from the scope and spirit of the invention. If desired, the output 1030 includes explanations for the various results 1035.

Figure 11:
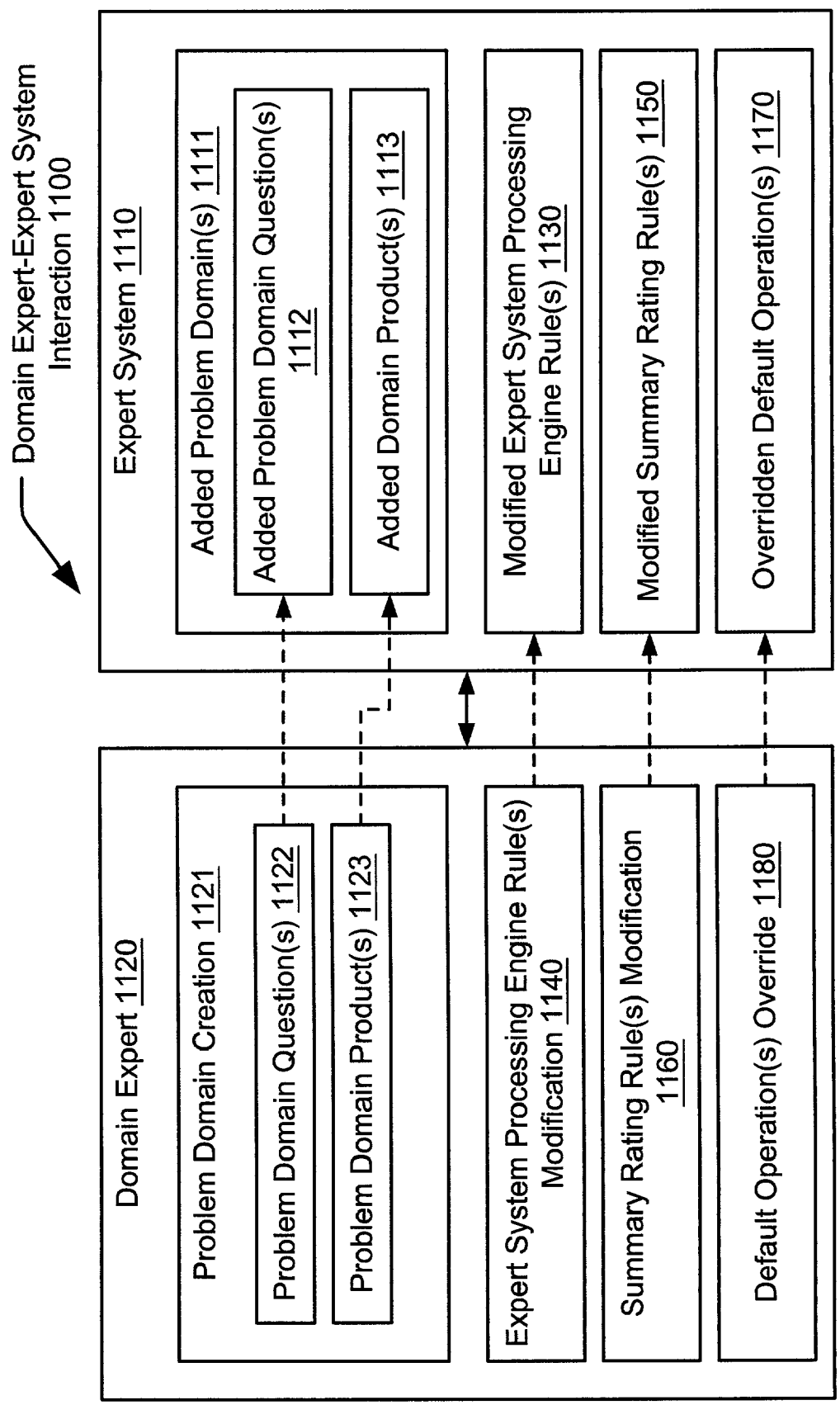
FIG. 11 is a system diagram illustrating an embodiment of interaction between a domain expert and an expert system in accordance with certain aspects of the present invention.

FIG. 11 is a system diagram illustrating an embodiment of interaction between a domain expert and an expert system 1100 in accordance with certain aspects of the present invention. A domain expert 1120 is authorized to identify, or create, the various problem domains for use within an expert system 1110. To perform problem domain creation 1121, the domain expert 1120 uses problem domain question(s) 1122 and can present those in light of the problem domain product(s) 1123 that are available that may provide a solution for the problem domain. In light of the creation of the problem domains 1121 by the domain expert, the expert system 1110 will accommodate the added problem domain(s) 1111. The problem domain question(s) 1122 and the problem domain product(s) 1123 results in added problem domain question(s) 1112 and added domain product(s) 1113 within the added problem domain(s) 1111 within the expert system 1110.

In this embodiment, the domain expert 1120 is also afforded the ability to perform expert system processing engine rule(s) modification 1140 for the processing engines employed by the expert system 1110. The modified processing engine rule(s) 1130 are then employed by the expert system 1110. Similarly, the domain expert 1120 is also afforded the ability to perform summary rating rule(s) modification 1160 for the summary rating operations within the expert system 1110. The modified summary rating rule(s) 1150 are then employed by the expert system 1110. Moreover, the domain expert 1120 is also afforded the ability to override default operation(s) 1180 for the default operations to be performed by the expert system 1110. The overridden default operation(s) 1170 are then employed within the default operations of the expert system 1110.

In addition to the robustness, variability, and adaptability of an expert system that is built in accordance with the invention, such an expert system has been generated in light of a number of goals as well. The expert system is operable to change its recommendations smoothly as the inputs change. For example, adding one more employee to a site should not lead to drastic changes to the recommendations. The expert system is operable to accommodate minor changes and deviations of inputs without catastrophically failing, or by producing radically different output.

Moreover, a domain expert of relatively low skill level, or minimal computer training, is also to perform a number of tasks, some of which are enumerated in the FIG. 11. For example, the domain expert may easily add new problem domains, as shown in the problem domain creation functional block 1121. The domain expert is also able to add new traits to each problem domain. For example, this may include adding new questions to a GUI, such as a web page, and then transforming the answers into needs. The domain expert may also add new products to each of the problem domains, as desired. The domain expert may also modify the manner in which customer answers are converted into needs; this would also include deciding whether to employ fuzzy or non-fuzzy (crisp) values. The domain expert may also change the rule that creates summary ratings for a product based on its ratings for each trait, as illustrated in the summary rating rule modification functional block 1120 of the FIG. 11. The domain expert may also fine tune the rules to affect the recommendations made by the expert system as well.

As described above in many of the various embodiments, the expert system provided for sub-second response time in its own code (not counting network traffic) for any input-to-recommendation transaction. This enables real time interaction between agent and customer. In addition, the expert system is able to provide explanation for the reasons that lead to particular recommendations.

Figure 12:
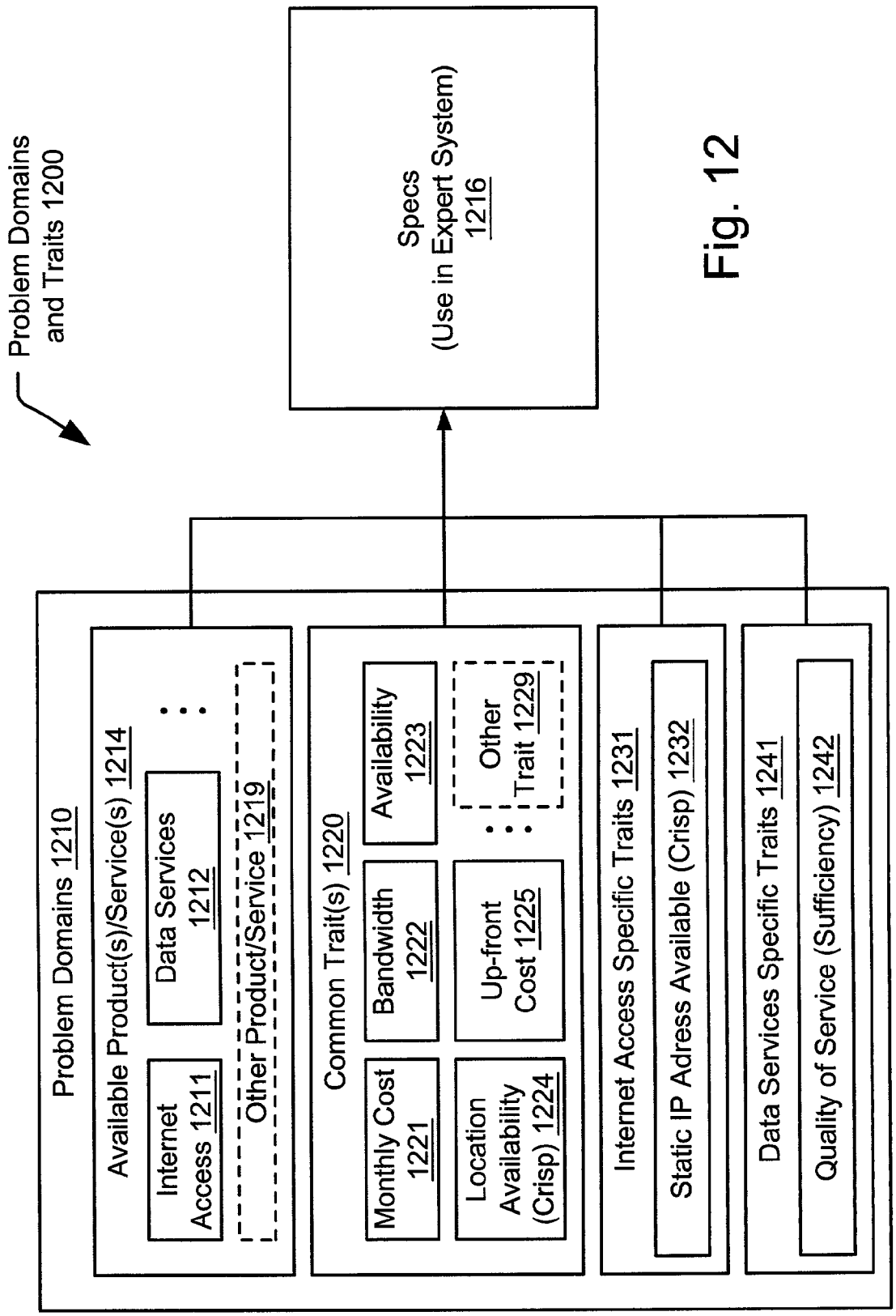
FIG. 12 is a block diagram illustrating an embodiment of definitions of problem domains and traits that are usable within an expert system that is built in accordance with certain aspects of the present invention.

FIG. 12 is a block diagram illustrating an embodiment of definitions of problem domains and traits 1200 that are usable within an expert system that is built in accordance with certain aspects of the present invention. In this embodiment, an example of problem domains 1210 is shown for any number of available product(s)/service(s) 1214. The available product(s)/service(s) 1214 includes Internet access 1211 and data services 1212. In addition, the available product(s)/service(s) 1214 may also include any other product/service 1219 as well.

For the Internet access 1211 and data services 1212 share a number of common trait(s) 1220, and each of the Internet access 1211 and data services 1212 has specific traits as well. Examples of common trait(s) 1220 shared between them include monthly cost 1221, bandwidth 1222, availability 1223, location availability (crisp) 1224, and up-front cost 1225. In addition, any other trait 1229 may also be included or adapted for a given situation or application. An example of Internet access specific traits 1231 includes whether a static Internet protocol address is available (crisp) 1232 for the customer. An example of data services specific traits 1241 includes whether a quality of service, or sufficiency of the quality of service, 1242 is appropriate for a given situation or application to meet a customer's needs or desires. All of the information within the problem domain 1210 is provided via specs 1216 for use in an expert system. The expert system is any expert system as described in any of the various embodiments of the invention.

It is also noted, as will be understood by those persons having skill in the art, that certain aspects of the present invention may be stored on media, in software form having an instruction set, so that it may be transported from device to device. This way, any suitable processing circuitry, including microprocessors, computers, and other processing devices, may execute that instruction set to achieve the various aspects of the present invention.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A method for recommending a product using a computer implemented expert system, the method comprising:
    utilizing the expert system to determine problem domain information via interaction between a live human agent and a customer;
    utilizing the expert system to determine need information of the customer via interaction between the live human agent and the customer, wherein the need information relates to telecommunications needs of the customer;
    inputting the customer need information into the expert system, wherein the act of inputting the customer need information into the expert system is performed by the live human agent;
    transforming the customer need information into a trait, the trait being characteristic of a telecommunications product of relevance to the customer, the telecommunications product of relevance being selected from a plurality of available telecommunications products;
    calculating a rating of at least three telecommunications products within the plurality of available telecommunications products, wherein the act of calculating the ratings is performed by the expert system; and
    presenting an output comprising a recommended solution, a compatible solution, and a not recommended solution, wherein each of said recommended solution, said compatible solution and said not recommended solution are alternative solutions selected from the plurality of available telecommunications products by the expert system, and wherein said output is generated by said expert system.

2. The method of claim 1, wherein utilizing the expert system to determine the need information of the customer comprises asking questions provided by the expert system and inputting the customer need information into the expert system via a graphical user interface serviced by an agent computer.

3. The method of claim 1, further comprising:
    summarizing the ratings of the plurality of available telecommunications products; and
    providing explanation of the ratings of the plurality of available telecommunications products.

4. The method of claim 3, wherein the summary of the ratings of the plurality of available telecommunications products comprises at least one of the recommended solution, the compatible solution, and the not recommended solution.

5. The method of claim 1, wherein the plurality of available telecommunications products comprises a service.

6. The method of claim 1, further comprising communicating the rating from the live human agent to the customer; and
    wherein the calculating the rating of the at least three telecommunications products within the plurality of available telecommunications products is performed in real time.

7. The method of claim 1, wherein the expert system employs a fuzzy value in calculating the rating of the at least three telecommunications products.

8. The method of claim 1, wherein the expert system employs a crisp value in calculating the rating of the at least three telecommunications products.

9. The method of claim 1, wherein the plurality of available telecommunications products comprises a plurality of telecommunications network configurations.

10. The method of claim 9, wherein the rated telecommunications product comprises a telecommunications network product comprises a telecommunications network configuration.

11. An expert system that is operable for recommending a product, the expert system comprising:
- a computer network;
- a live human agent interface, communicatively coupled to the computer network, comprising a graphical user interface;
- a product database, communicatively coupled to the computer network, that contains a plurality of available telecommunications products, the product database being communicatively coupled to a plurality of providers of the plurality of available telecommunications products thereby allowing updating of the product database in real time; and
- an expert system, communicatively coupled to the computer network, that is operable to rate at least two available telecommunications products within the plurality of available telecommunications products using dynamic calculation and based on a customer need;
- wherein the expert system comprises computer executable instructions which allow a live human agent to perform selection of an available telecommunications product from the product database based on the rating of the at least two available telecommunications products during an interaction with a customer;
- wherein the expert system generates output comprising a recommended telecommunications solution and a compatible telecommunications solution and presents the output to the live human agent via the graphical user interface, each of the recommended telecommunications solution and a compatible telecommunications solution being an alternative solution selected from the plurality of available telecommunications products within the product database, the recommended telecommunications solution having a rating that is higher than the rating of the compatible telecommunications solution; and
- wherein the recommended telecommunications solution and the compatible telecommunications solution are communicated to the customer in real time after the expert system generates the output.

12. The expert system of claim 11, wherein at least one of the recommended solution and the compatible solution comprises at least one of a data network solution and an Internet access solution.

13. The expert system of claim 11, wherein the output further comprises an explanation for why the recommended solution was selected by the expert system.

14. The expert system of claim 11, wherein the expert system employs at least one of a dedicated Internet access guidance engine and a data network guidance engine to rate the at least two available products within the plurality of available products.

15. The expert system of claim 11, wherein the graphical user interface is operable to present information concerning at least one of the available products within the plurality of available products to the live human agent.

16. A plurality of software instructions stored on a tangible media that, upon execution by a processing circuitry, are operable to recommend a product by using an expert system, comprising:
- a set of instructions executed by the processing circuitry that determines problem domain information during an interaction between a live human agent and a customer, wherein the problem domain relates to a telecommunications network configuration;
- a set of instructions executed by the processing circuitry that determines need information of the customer during the interaction between the live human agent and the customer, wherein the need information relates to a telecommunications network configuration;
- a set of instructions executed by the processing circuitry that inputs the customer need information into the expert system;
- a set of instructions executed by the processing circuitry that transforms the customer need information into a trait, the trait being characteristic of a product of relevance to the customer as determined using expert system processing that is performed by the expert system, the product of relevance being selected from a plurality of available products;
- a set of instructions executed by the processing circuitry that rates a product within the plurality of available products using the expert system, wherein the product comprises a telecommunications network configuration; and
- a set of instructions executed by the processing circuitry that presents an output to the live human agent, said output comprising a recommended solution, and a not-recommended solution, wherein the recommended solution and the not-recommended solution comprise alternative products selected from the plurality of available products.

17. A plurality of software instructions stored on a tangible media that, upon execution by a processing circuitry, are operable to recommend a telecommunications network configuration, comprising:
- a set of instructions executed by the processing circuitry that performs expert system processing to rate at least two available products within a plurality of available products using dynamic calculation and based on a customer need, wherein the products comprise a telecommunications network configuration;
- a set of instructions executed by the processing circuitry that enable a live human agent to respond to a communication of a customer need by accessing the functionality of the expert system processing via the graphical user interface to perform selection of an available product from the product database based on the rating of the at least two available products in real time during an interaction with a customer;
- a set of instructions executed by the processing circuitry that generates output comprising a recommended solution and a compatible solution and presents the output to the live human agent via the graphical user interface, each of the recommended solution and a compatible solution being an alternative solution selected from the plurality of available products within the product database, the recommended solution having a rating that is higher than the rating of the compatible solution; and
- a set of instructions executed by the processing circuitry that prompts the live human agent with the recommended solution comprising a network configuration and the compatible solution to be communicated to the customer in real time.

18. A method for providing a network configuration solution to a customer, the method comprising:

utilizing an expert system to obtain information from a customer regarding product needs of the customer via interaction between a live human agent and the customer;

presenting an interface allowing the live human agent to enter the information into a computer system, wherein the computer system comprises the expert system;

processing the information, wherein the act of processing is performed by the expert system within the computer system;

producing at least three product solutions, wherein the at least three product solutions are produced by the expert system within the computer system, wherein the act of producing at least three product solutions is performed in accordance with the entered and processed information, wherein said at least three product solutions comprise a recommended solution, a compatible solution, and a not recommended solution, and wherein said recommended solution, said compatible solution, and said not recommended solution comprise alternative solutions;

presenting the at least three product solutions to the live human agent, wherein the act of presenting the at least three product solutions to the live human agent is performed by the computer system; and presenting at least a portion of the at least three product solutions produced by the expert system to the customer, wherein the act of presenting at least a portion of the at least one product solution to the customer is performed by the live human agent.

19. The method of claim 18, wherein the act of processing comprises using fuzzy logic to produce at least one product solution.

20. The method of claim 18, wherein the act of processing comprises using heuristics to produce at least one product solution.

21. The method of claim 18, further comprising presenting a plurality of product solutions to the customer.

22. The method of claim 20, wherein each product solution of the plurality of product solutions is qualified by a ranking selected from a plurality of rankings.

23. The method of claim 22, wherein the plurality of rankings comprise recommended, compatible, and not recommended.

24. The method of claim 22, further comprising providing a script to the live human agent, wherein the act of providing a script is performed by the expert system via the computer system.

25. The method of claim 24, wherein the provided script relates to the act of obtaining information from the customer.

26. The method of claim 25, wherein the script comprises one or more questions for the live human agent to ask the customer.

27. The method of claim 18, wherein the customer has no direct interaction with the expert system.

28. The method of claim 18, wherein the needs of the customer comprise telecommunications needs.

29. The method of claim 18, wherein the at least three product solutions comprises a telecommunications network configuration solution.

30. The method of claim 18, wherein at least a portion of the needs of the customer are represented as data points.

31. The method of claim 30, wherein the at least a portion of the needs of the customer are represented as data points by the live human agent during the act of entering the information into the computer system.

32. The method of claim 30, wherein the at least a portion of the needs of the customer are represented as data points by the expert system during the act of processing the information.

* * * * *

UNITED STATES PATENT AND TRADEMARK OFFICE
CERTIFICATE OF CORRECTION

| | | |
|---|---|---|
| PATENT NO. | : 7,885,820 B1 | Page 1 of 1 |
| APPLICATION NO. | : 09/909250 | |
| DATED | : February 8, 2011 | |
| INVENTOR(S) | : Rod Mancisidor et al. | |

It is certified that error appears in the above-identified patent and that said Letters Patent is hereby corrected as shown below:

Col. 6, line 42 reads "...$Y_n/x_n$ ..." which should be deleted and replaced with "...$y_n/x_n$...."

Signed and Sealed this
Twelfth Day of April, 2011

David J. Kappos
*Director of the United States Patent and Trademark Office*